(12) United States Patent
Hoshi et al.

(10) Patent No.: US 7,893,156 B2
(45) Date of Patent: Feb. 22, 2011

(54) BLOCK COPOLYMER AND COMPOSITION THEREOF

(75) Inventors: Susumu Hoshi, Kanagawa (JP); Masahiro Mori, Kanagawa (JP); Yukio Yamaura, Saitama (JP); Toshinori Shiraki, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/512,410

(22) PCT Filed: Apr. 23, 2003

(86) PCT No.: PCT/JP03/05210

§ 371 (c)(1), (2), (4) Date: Oct. 25, 2004

(87) PCT Pub. No.: WO03/091303

PCT Pub. Date: Nov. 6, 2003

(65) Prior Publication Data

US 2005/0222331 A1 Oct. 6, 2005

(30) Foreign Application Priority Data

Apr. 25, 2002 (JP) .......................... P.2002-123510
Nov. 25, 2002 (JP) .......................... P.2002-341185
Feb. 4, 2003 (JP) .......................... P.2003-026606

(51) Int. Cl.
C08L 53/02 (2006.01)
C08F 297/04 (2006.01)

(52) U.S. Cl. ............................. 525/71; 525/93; 525/98; 525/99; 525/314; 525/315; 525/316; 525/89; 525/271

(58) Field of Classification Search .................. 525/89, 525/271, 71, 93, 98, 99, 314, 315, 316
See application file for complete search history.

(56) References Cited

U.S. PATENT DOCUMENTS

| 4,386,125 | A | | 5/1983 | Shiraki et al. |
| 4,940,756 | A | * | 7/1990 | Broekhuis et al. ........... 525/237 |
| 5,089,558 | A | * | 2/1992 | Hall et al. ..................... 525/89 |
| 5,227,419 | A | * | 7/1993 | Moczygemba et al. ...... 524/128 |
| 5,504,156 | A | | 4/1996 | Takezaki et al. |
| 5,972,519 | A | | 10/1999 | Niessner et al. |
| 6,031,053 | A | * | 2/2000 | Knoll et al. .................. 525/314 |
| 6,043,315 | A | * | 3/2000 | Gottschalk et al. ........ 525/92 B |
| 6,107,411 | A | * | 8/2000 | Toya et al. ................... 525/316 |
| 6,162,867 | A | | 12/2000 | Güntherberg et al. |
| 6,235,847 | B1 | * | 5/2001 | Hoshi et al. .................. 525/314 |
| 6,326,127 | B1 | * | 12/2001 | Morren et al. ............ 430/286.1 |
| 6,579,937 | B1 | | 6/2003 | Güntherberg et al. |
| 6,660,790 | B1 | | 12/2003 | Hoshi et al. |
| 7,323,512 | B2 | | 1/2008 | Hoshi et al. |
| 2003/0176582 | A1 | * | 9/2003 | Bening et al. ............... 525/242 |
| 2003/0181584 | A1 | * | 9/2003 | Handlin et al. ................ 525/88 |
| 2004/0077789 | A1 | | 4/2004 | Toda et al. |
| 2004/0102576 | A1 | * | 5/2004 | Matsui et al. ............... 525/180 |

FOREIGN PATENT DOCUMENTS

| DE | 198 58 141 A1 | 6/2000 |
| EP | 0 852 240 A1 | 7/1998 |
| JP | 9-324084 | 12/1997 |
| JP | 11-158241 | 6/1999 |
| JP | 2000-006321 A | 1/2000 |
| JP | 2000-26698 | 1/2000 |
| JP | 2001-2871 | 1/2001 |
| JP | 2001-354827 | 12/2001 |
| JP | 2002-030126 | 1/2002 |
| WO | WO 02/02692 | 1/2002 |
| WO | WO 02/02693 A1 | 1/2002 |
| WO | WO 02/38642 * | 5/2002 |
| WO | WO 03/060009 | 7/2003 |

OTHER PUBLICATIONS

Office Action for Japanese Patent Application No. 2003-587858 dated Jan. 6, 2009.

* cited by examiner

Primary Examiner—Jeffrey C Mullis
(74) Attorney, Agent, or Firm—Finnegan, Henderson, Farabow, Garrett & Dunner, L.L.P.

(57) ABSTRACT

The present invention provides a block copolymer or a hydrogenated product thereof excellent in low-temperature shrinkability, natural shrinkability, rigidity and the like, excellent in a balance of physical properties such as blocking resistance, resistance to fusion bonding in hot water, impact resistance and the like, and having a few fish eyes (FE's) caused by gels. Further, the invention provides a heat shrinkable film and a heat shrinkable multilayer film suitable for drink container packaging, cap seals and the like, using such a block copolymer or the hydrogenated product thereof. The invention provides a block copolymer having a weight ratio of a vinyl aromatic hydrocarbon and a conjugated diene of 60/40 to 90/10 and a number average molecular weight measured by gel permeation chromatography (GPC) of 30,000 to 500,000, wherein the vinyl aromatic hydrocarbon constituting the block copolymer has a block rate of from 10 to 90% by weight, the vinyl aromatic hydrocarbon polymer blocks constituting the block copolymer have a peak molecular weight within the molecular weight range of 5,000 to 30,000, and 40 to 80% by weight of the vinyl aromatic hydrocarbon polymer blocks have a molecular weight of 35,000 or less.

25 Claims, No Drawings

BLOCK COPOLYMER AND COMPOSITION THEREOF

TECHNICAL FIELD

The present invention relates to a block copolymer suitable for a heat shrinkable film, which is excellent in a balance of physical properties such as natural shrinkability, low-temperature shrinkability, rigidity, transparency and impact resistance, and a composition thereof.

Further, the invention relates to a sheet/film, a heat shrinkable film and a heat shrinkable multilayer film which are excellent in a balance of physical properties such as low-temperature shrinkability, natural shrinkability, rigidity, blocking resistance, resistance to fusion bonding in hot water and impact resistance, and have a few fish eyes (FE's) caused by gels.

BACKGROUND ART

A block copolymer comprising a vinyl aromatic hydrocarbon and a conjugated diene, which has a relatively high vinyl aromatic hydrocarbon content, has been used for injection molding applications and extrusion molding applications such as sheets and films, utilizing characteristics such as transparency and impact resistance. In particular, a heat shrinkable film using the block copolymer comprising a vinyl aromatic hydrocarbon and a conjugated diene has no problems of a residual monomer, plasticizer residues and the generation of hydrogen chloride in burning of a vinyl chloride resin which has conventionally used, so that it has been utilized for food packaging, cap seals, labels and the like. As characteristics necessary for a heat shrinkable film, there are requirements such as natural shrinkability, low-temperature shrinkability, transparency, mechanical strength and aptitude for packaging machinery. In order to improve these characteristics and obtain a good balance of physical properties, various studies have hitherto been made.

For example, the document 1 identified below discloses a method for producing a heat shrinkable film by preheating a styrene-butadiene block copolymer, and then, stretching it, in order to improve heat shrinkability. The document 2 identified below discloses a composition of a vinyl aromatic hydrocarbon-aliphatic unsaturated carboxylic acid derivative copolymer having an aliphatic unsaturated carboxylic acid derivative content of 5 to 80% by weight and a Vicat softening point not exceeding 90° C., and a block copolymer comprising a vinyl aromatic hydrocarbon and a conjugated diene, in order to obtain a composition excellent in mechanical characteristics, optical characteristics, stretching characteristics, crack resistance characteristics and the like. The document 3 identified below discloses a heat shrinkable film which comprises a block copolymer comprising a vinyl aromatic hydrocarbon and a conjugated diene, the segments thereof having a specific Tg, in order to obtain a heat shrinkable film excellent in shrinkable characteristics and environmental destruction resistance. The document 4 identified below discloses a low-temperature shrinkable film obtained by stretching a composition of a vinyl aromatic hydrocarbon-aliphatic unsaturated carboxylic acid derivative copolymer having a vinyl aromatic hydrocarbon content of 95 to 20% by weight and a Vicat softening point not exceeding 90° C., and a block copolymer comprising a vinyl aromatic hydrocarbon and a conjugated diene, in order to obtain low-temperature shrinkability, optical characteristics, crack resistance characteristics, dimensional stability and the like. The document 5 identified below discloses a polystyrene heat shrinkable film comprising a composition of a block copolymer comprising a styrene-based hydrocarbon and a conjugated diene hydrocarbon and a styrene-based hydrocarbon-containing random copolymer having a specific Tg, in order to improve natural shrinkability at room temperature. The document 6 identified below discloses a transparent high-strength resin composition containing a block copolymer comprising a vinyl aromatic hydrocarbon block of a specific structure and a copolymer block of a vinyl aromatic hydrocarbon and a conjugated diene, and a copolymer of a vinyl aromatic hydrocarbon and a (meth) acrylic ester, in order to obtain a resin composition excellent in transparency and impact resistance. The document 7 identified below discloses a multilayer low-temperature shrinkable film having at least one layer of a composition of a vinyl aromatic hydrocarbon-aliphatic unsaturated carboxylic acid derivative copolymer having a vinyl aromatic hydrocarbon content of 95 to 20% by weight and a Vicat softening point not exceeding 90° C. and a block copolymer comprising a vinyl aromatic hydrocarbon and a conjugated diene, in order to obtain a shrinkable film excellent in low-temperature shrinkability, optical characteristics, crack resistance characteristics, dimensional stability and the like. The document 8 identified below discloses a multilayer low-temperature shrinkable polystyrene film having a specific heat shrinkage ratio in which an intermediate layer contains a styrene-(meth)acrylic ester copolymer having a specific Vicat softening point as a main component, and inner and outer layers have a styrene-conjugated diene block copolymer having a specific Vicat softening point as a main component, in order to obtain a heat shrinkable film excellent in heat shrinkability at low temperatures, shrinkage finishing properties and natural shrinkage ratio, and developing no blocking between films in a hot state.

However, these block copolymers comprising a vinyl aromatic hydrocarbon and a conjugated diene, or the compositions comprising the block copolymer and a vinyl aromatic hydrocarbon-aliphatic unsaturated carboxylic derivative copolymer are insufficient in a balance of natural shrinkability, low-temperature shrinkability, rigidity, transparency, blocking resistance, resistance to fusion bonding in hot water and impact resistance, and in inhibition of fish eyes (FE's) caused by gels. These documents do not disclose any methods for improving them.

[Patent Document 1]
JP 57-34921 A
[Patent Document 2]
JP 59-221348 A
[Patent Document 3]
JP 60-224520 A
[Patent Document 4]
JP 61-25919 A
[Patent Document 5]
JP 4-52129 A
[Patent Document 6]
JP 7-216187 A
[Patent Document 7]
JP 61-41544 A
[Patent Document 8]
JP 2002-46231 A An object of the present invention is to provide a block copolymer and a hydrogenated product thereof, suitable for a heat shrinkable film, which is excellent in a balance of physical properties such as natural shrinkability, low-temperature shrinkability, rigidity, transparency and impact resistance, and further to provide a composition thereof. Further, another object of the invention is to provide a sheet/film, a heat shrinkable film and a heat shrinkable multilayer film which are excellent in a balance of blocking resistance and resistance to fusion bonding in hot water, in addition to the above-mentioned characteristics, and have a few FE's.

DISCLOSURE OF THE INVENTION

The present inventors have made extensive studies. As a result, it has been found that the above-mentioned objects are achieved by a specific block copolymer, thus completing the invention. That is, the invention relates to a block copolymer having a weight ratio of a vinyl aromatic hydrocarbon and a conjugated diene of 60/40 to 90/10 and a number average molecular weight measured by gel permeation chromatography (GPC) of 30,000 to 500,000, wherein the vinyl aromatic hydrocarbon constituting the block copolymer has a block rate of from 10 to 90% by weight, the vinyl aromatic hydrocarbon polymer blocks constituting the block copolymer have a peak molecular weight within the molecular weight range of 5,000 to 30,000, and 40 to 80% by weight of the vinyl aromatic hydrocarbon polymer blocks have a molecular weight of 35,000 or less.

Further, the invention relates to a hydrogenated product of the above-mentioned block copolymer, and a block copolymer composition comprising the above-mentioned block copolymer or the hydrogenated product thereof.

Furthermore, the invention relates to a sheet/film, a heat shrinkable film and a heat shrinkable multilayer film which comprise the above-mentioned block copolymer or the hydrogenated product thereof, or the block copolymer composition.

BEST MODE FOR CARRYING OUT THE INVENTION

The invention will be described in detail below.

In the block copolymer of the invention, the weight ratio of the vinyl aromatic hydrocarbon and the conjugated diene is from 60/40 to 90/10, preferably from 65/35 to 85/15, and more preferably from 70/30 to 83/17. When the ratio of the vinyl aromatic hydrocarbon and the conjugated diene is 60/40 or more, rigidity is excellent, and when it is 90/10 or less, a heat shrinkable film improved in impact resistance can be obtained. The vinyl aromatic hydrocarbon content of the hydrogenated product of the block copolymer may be grasped by the vinyl aromatic compound content.

The block rate of the vinyl aromatic hydrocarbon incorporated into the block copolymer of the invention is from 10 to 90% by weight, preferably from 15 to 85% by weight, and more preferably from 25 to 80% by weight. When the block rate is 10% by weight or more, fusion bonding in hot water is excellent, and when it is 85% by weight or less, a heat shrinkable film excellent in low-temperature shrinkability can be obtained. In the case of obtaining the block copolymer having good rigidity, the block rate of the vinyl aromatic hydrocarbon is recommended to be from exceeding 50% by weight to 90% by weight, preferably from 60 to 85% by weight, and more preferably from 65 to 80% by weight. In the invention, the vinyl aromatic hydrocarbon block means one having an average polymerization degree of about 30 or more.

The block rate of the vinyl aromatic hydrocarbon incorporated into the block copolymer of the invention can be measured by a method of subjecting the block copolymer before hydrogenation to oxidative degradation using t-butyl hydroperoxide in the presence of osmium tetraoxide as a catalyst (a method described in I. M. KOLTHOFF, et al., *J. Polym. Sci.*, 1, 429 (1946)), and means a value determined from the following equation, using vinyl aromatic hydrocarbon polymer block components (provided that vinyl aromatic hydrocarbon polymer block components having an average polymerization degree of about 30 or less are excluded) obtained by the method.

Block rate (% by weight)=(the weight of the vinyl aromatic hydrocarbon polymer blocks in the block copolymer/the weight of the whole vinyl aromatic hydrocarbons in the block copolymer)× 100

In the invention, for the purpose of obtaining a heat shrinkable multilayer film excellent in balance performance of low-temperature shrinkability and resistance to fusion bonding in hot water, the content of the vinyl aromatic hydrocarbon polymer blocks in the block copolymer is recommended to be from exceeding 40% by weight to 85% by weight, preferably from 45 to 83% by weight, and more preferably from 50 to 80% by weight.

The vinyl aromatic hydrocarbon polymer blocks constituting the block copolymer of the invention have a peak molecular weight within the molecular weight range of 5000 to 30000, preferably 5000 to 20000, more preferably 5000 to 15000, and particularly preferably 7000 to 13000. Particularly preferably, they have peak molecular weights within the molecular weight range of 5000 to 30000, preferably 5000 to 20000, more preferably 5000 to 15000, and particularly preferably 7000 to 13000, and within the molecular weight range of 35000 to 150000, preferably 35000 to 130000, more preferably 35000 to 100000 and particularly preferably 40000 to 80000, respectively.

In the block copolymer of the invention, the vinyl aromatic hydrocarbon polymer blocks have a peak molecular weight within the molecular weight range of 5000 to 30000, thereby being able to obtain a heat shrinkable film excellent in natural shrinkability and low-temperature shrinkability. Further, the vinyl aromatic hydrocarbon polymer blocks have peak molecular weights within the molecular weight range of 5000 to 30000, and within the molecular weight range of 35000 to 150000, respectively, thereby being able to obtain a heat shrinkable film excellent in natural shrinkability, low-temperature shrinkability and resistance to fusion bonding in hot water.

In the block copolymer of the invention, 40 to 80% by weight, preferably 45 to 80% by weight, more preferably 50 to 75% by weight and particularly preferably 55 to 75% by weight of the vinyl aromatic hydrocarbon polymer blocks incorporated into the block copolymer have a molecular weight of 35000 or less. When 40 to 80% by weight of the vinyl aromatic hydrocarbon polymer blocks have a molecular weight of 35000 or less, a heat shrinkable film excellent in natural shrinkability and low-temperature shrinkability can be obtained. In the invention, the molecular weight of the vinyl aromatic hydrocarbon polymer blocks incorporated into the block copolymer is specified by gel permeation chromatography (GPC) using the same vinyl aromatic hydrocarbon polymer block components as those obtained by the above-mentioned oxidative degradation method and used for the measurement of the block rate. Monodisperse polystyrene for gel permeation chromatography (GPC) is subjected to GPC to prepare calibration curves of the peak count number thereof and the number average molecular weight of the monodisperse polystyrene, and the molecular weight is calculated according to a conventional method (for example, *Gel Chromatography <Basic Course>*, published by Kodansha Ltd.). The peak molecular weight can be determined from a gel permeation chromatogram, and the ratio of the vinyl aromatic hydrocarbon polymer block components having a molecular weight of 35000 or less can be determined from the area ratio of the gel permeation chromatogram. The molecular weight of the vinyl aromatic hydrocarbon blocks incorporated into the block copolymer and the amount of the components having a molecular weight of 35000 or less can be controlled by changing the weight of the vinyl aromatic hydrocarbon, the weights of the vinyl aromatic hydrocarbon and the conjugated diene and the weight ratio thereof, the polymerization reactivity ratio, the amount of a catalyst and the like.

The block copolymer of the invention has a number average molecular weight (molecular weight in terms of polystyrene) measured by gel permeation chromatography (GPC) ranging from 30000 to 500000, preferably from 50000 to 500000 and more preferably from 70000 to 300000, and may be a mixture of a plurality of block copolymers different in molecular weight. The preferred melt flow index (measured according to JIS K-6870, under conditions G, temperature: 200° C., load: 5 Kg) of the block copolymer is recommended to be from 0.1 to 100 g/10 min, from 0.5 to 50 g/10 min, and more preferably from 1 to 30 g/10 min, in respect to molding processability. The molecular weight and the melt flow index can be arbitrarily adjusted by the amount of the catalyst used in polymerization.

The block copolymer of the invention is preferably any of the following block copolymer mixtures:

(1) The block copolymer according to claim 1 or 2, which comprises:

10 to 90 parts by weight of a block copolymer (component 1) having a weight ratio of a vinyl aromatic hydrocarbon and a conjugated diene constituting the block copolymer of from 70/30 to 95/5, wherein the vinyl aromatic hydrocarbon polymer blocks have peak molecular weights within the molecular weight range of 5000 to 30000, and within the molecular weight range of 35000 to 150000, respectively; and 90 to 10 parts by weight of a block copolymer (component 2) having a weight ratio of a vinyl aromatic hydrocarbon and a conjugated diene constituting the block copolymer of from 50/50 to 85/15, wherein the vinyl aromatic hydrocarbon polymer blocks have peak molecular weights within the molecular weight range of 5000 to 30000, and within the molecular weight range of 35000 to 150000, respectively, with the proviso that the total amount of component 1 and component 2 is 100 parts by weight, and that component 1 has a vinyl aromatic hydrocarbon content larger than that of component 2 by at least 3% by weight;

(2) The block copolymer according to claim 1 or 2, which comprises:

10 to 90 parts by weight of a block copolymer (component 1) having a weight ratio of a vinyl aromatic hydrocarbon and a conjugated diene constituting the block copolymer of from 70/30 to 95/5, wherein the vinyl aromatic hydrocarbon polymer blocks have peak molecular weights within the molecular weight range of 5000 to 30000, and within the molecular weight range of 35000 to 150000, respectively; and 90 to 10 parts by weight of a block copolymer (component 3) having a weight ratio of a vinyl aromatic hydrocarbon and a conjugated diene constituting the block copolymer of from 50/50 to 85/15, wherein the vinyl aromatic hydrocarbon polymer blocks have a peak molecular weight within the molecular weight range of 5000 to 30000, with the proviso that the total amount of component 1 and component 3 is 100 parts by weight, and that component 1 has a vinyl aromatic hydrocarbon content larger than that of component 3 by at least 3% by weight; and (3) The block copolymer according to claim 1 or 2, which comprises:

10 to 90 parts by weight of a block copolymer (component 4) having a weight ratio of a vinyl aromatic hydrocarbon and a conjugated diene constituting the block copolymer of from 70/30 to 95/5, wherein the vinyl aromatic hydrocarbon polymer blocks have a peak molecular weight within the molecular weight range of 5000 to 30000; and 90 to 10 parts by weight of a block copolymer (component 2) having a weight ratio of a vinyl aromatic hydrocarbon and a conjugated diene constituting the block copolymer of from 50/50 to 85/15, wherein the vinyl aromatic hydrocarbon polymer blocks have peak molecular weights within the molecular weight range of 5000 to 30000, and within the molecular weight range of 35000 to 150000, respectively, with the proviso that the total amount of component 4 and component 2 is 100 parts by weight, and that component 4 has a vinyl aromatic hydrocarbon content larger than that of component 2 by at least 3% by weight.

When the block copolymer of the invention is a block copolymer mixture and, among combined mixtures of the above-mentioned components 1 to 4, in the case of a mixture of component 1 and component 2, component 1 is from 10 to 90% by weight, preferably from 15 to 85% by weight, and more preferably from 20 to 80% by weight, and component 2 is from 90 to 10% by weight, preferably from 85 to 15% by weight, and more preferably from 80 to 20% by weight (with the proviso that the total amount of component 1 and component 2 is 100% by weight). In the invention, the vinyl aromatic hydrocarbon content of component 1 is larger than that of component 2 by at least 3% by weight, preferably at least 5% by weight, more preferably at least 10% by weight.

When the block copolymer of the invention comprises a mixture of component 1 and component 3, component 1 is from 10 to 90% by weight, preferably from 15 to 85% by weight, and more preferably from 20 to 80% by weight, and component 3 is from 90 to 10% by weight, preferably from 85 to 15% by weight, and more preferably from 80 to 20% by weight (with the proviso that the total amount of component 1 and component 3 is 100% by weight). In the invention, the vinyl aromatic hydrocarbon content of component 1 is larger than that of component 3 by at least 3% by weight, preferably at least 5% by weight, more preferably at least 10% by weight.

When the block copolymer of the invention comprises a mixture of component 4 and component 2, component 4 is from 10 to 90% by weight, preferably from 15 to 85% by weight, and more preferably from 20 to 80% by weight, and component 2 is from 90 to 10% by weight, preferably from 85 to 15% by weight, and more preferably from 80 to 20% by weight (with the proviso that the total amount of component 4 and component 2 is 100% by weight). In the invention, the vinyl aromatic hydrocarbon content of component 4 is larger than that of component 2 by at least 3% by weight, preferably at least 5% by weight, more preferably at least 10% by weight. When the composition ratio of the respective components of the mixture and the difference in the vinyl aromatic hydrocarbon content are within these ranges, a heat shrinkable film excellent in rigidity and impact resistance can be obtained.

The content of short-chain vinyl aromatic hydrocarbon polymer moieties with a vinyl aromatic hydrocarbon unit number of 1 to 3, based on the total amount of the vinyl aromatic hydrocarbons constituting the block copolymer of the invention is recommended to be from 1 to 25% by weight, preferably from 3 to 23% by weight, and more preferably from 5 to 20% by weight. When the content of the short-chain vinyl hydrocarbon polymer moieties is within the range of 1 to 25% by weight, rigidity is high and natural shrinkability is good. The content of the short-chain vinyl aromatic hydrocarbon polymer moieties can be determined by conducting gel permeation chromatography (GPC) of the vinyl aromatic hydrocarbon components, which has been obtained by dissolving the block copolymer in dichloromethane, subjecting it to oxidative degradation with ozone ($O_3$), and then, reducing the resulting ozonide with lithium aluminum hydride in diethyl ether, followed by hydrolysis with pure water, and calculating the area ratio of peaks obtained (see Takayuki Tanaka, Toshiya Sato and Yasunobu Nakafutami, *Kobunshi Gakkai Yokoshu* (Preprints of Meeting of the Society of Polymer Science), 29, 2051 (1980)).

The content of the short-chain vinyl aromatic hydrocarbon polymer moieties can be controlled by changing the weights, the weight ratio, the polymerization reactivity ratio and the like of the vinyl aromatic hydrocarbon and the conjugated diene in the course of copolymerization of the vinyl aromatic hydrocarbon and the conjugated diene in the production of the block copolymer. As specific methods, there can be employed methods of continuously supplying a mixture of the vinyl aromatic hydrocarbon and the conjugated diene to a polymerization system to polymerizing them, and/or copolymerizing the vinyl aromatic hydrocarbon and the conjugated diene using a polar compound or a randomizing agent, and the like. The polar compounds and randomizing agents include an ether such as tetrahydrofuran, diethylene glycol dimethyl ether or diethylene glycol dibutyl ether, an amine such as triethylamine or tetramethylethylenediamine, a thioether, a phosphine, a phosphoramide, an alkylbenzenesulfonate, an alkoxide of potassium or sodium, and the like. The microstructure of conjugated diene monomer units in the block copolymer, which is described later, can be adjusted by adding the polar compound or the like in a specified amount.

The block copolymer of the invention (including the above-mentioned block copolymer components 1 to 4) has at least one segment constituted by a vinyl aromatic hydrocarbon homopolymer and/or the copolymer comprising the vinyl aromatic hydrocarbon and the conjugated diene, and at least one segment constituted by a conjugated diene homopolymer and/or the copolymer comprising the vinyl aromatic hydrocarbon and the conjugated diene. Although there is no particular limitation on the polymer structure of the block copolymer, there can be used, for example, a linear block copolymer or a radial block copolymer represented by each of the following general formulas, or an arbitrary mixture of these polymer structures.

$(A-B)_n$, $A-(B-A)_n$, $B-(A-B)_{n+1}$, $[(A-B)_k]_{m+1}-X$, $[(A-B)_k-A]_{m+1}-X$, $[(B-A)_k]_{m+1}-X$ and $[(B-A)_k-B]_{m+1}-X$ (In the above formulas, segment A is the vinyl aromatic hydrocarbon homopolymer and/or the copolymer comprising the vinyl aromatic hydrocarbon and the conjugated diene, and segment B is the conjugated diene homopolymer and/or the copolymer comprising the vinyl aromatic hydrocarbon and the conjugated diene. X represents, for example, a residue of a coupling agent such as silicon tetrachloride, tin tetrachloride, 1,3-bis(N,N-glycidylaminomethyl)cyclohexane or epoxidized soybean oil, or a residue of a polymerization initiator such as a multifunctional organic lithium compound. n, k and m are an integer of 1 or more, generally an integer of 1 to 5. Further, the structures of a plurality of polymer chains bonded to X may be the same or different.) Furthermore, in the radial block copolymer represented by the above-mentioned general formula, at least one A and/or B may be further bonded to X.

As for the relationship between the vinyl aromatic hydrocarbon content in segment A ({the vinyl aromatic hydrocarbon in segment A/(the vinyl aromatic hydrocarbon+the conjugated diene in segment A)}×100) and the vinyl aromatic hydrocarbon content in segment B ({the vinyl aromatic hydrocarbon in segment B/(the vinyl aromatic hydrocarbon+the conjugated diene in segment B)}×100), the vinyl aromatic hydrocarbon content in segment A is larger than the vinyl aromatic hydrocarbon content in segment B. The preferred difference in the vinyl aromatic hydrocarbon content between segment A and segment B is preferably 5% by weight or more. In the invention, the vinyl aromatic hydrocarbon in the copolymer of the vinyl aromatic hydrocarbon and the conjugated diene in segment A and segment B may be distributed either uniformly or in a tapering (gradually decreasing) manner. Further, in the copolymer, a plurality of moieties in which the vinyl aromatic hydrocarbon is uniformly distributed and/or a plurality of moieties in which the vinyl aromatic hydrocarbon is distributed in a tapering manner may coexist in the segment.

In the invention, the block copolymer before hydrogenation can be obtained by polymerizing the vinyl aromatic hydrocarbon and the conjugated diene in a hydrocarbon solvent, using an organic lithium compound as an initiator.

The vinyl aromatic hydrocarbons used in the invention include styrene, o-methylstyrene, p-methylstyrene, p-tert-butylstyrene, 1,3-dimethylstyrene, α-methylstyrene, vinylnaphthalene, vinylanthracene, 1,1-diphenylethylene, N,N-dimethyl-p-aminoethylstyrene, N,N-diethyl-p-aminoethylstyrene and the like, and particularly general ones include styrene. These may be used not only alone, but also as a mixture of two or more thereof.

The conjugated diene is a diolefin having a pair of conjugated double bonds, and examples thereof include 1,3-butadiene, 2-methyl-1,3-butadiene (isoprene), 2,3-dimethyl-1,3-butadiene, 1,3-pentadiene, 1,3-hexadiene and the like. Particularly general ones include 1,3-butadiene, isoprene and the like. These may be used not only alone, but also as a mixture of two or more thereof.

In the block copolymer of the invention, it is preferred that at least one polymer block selected from the group consisting of (i) a copolymer block comprising isoprene and 1,3-butadiene, (ii) a copolymer block comprising isoprene and a vinyl aromatic hydrocarbon and (iii) a copolymer block comprising isoprene, 1,3-butadiene and a vinyl aromatic hydrocarbon is incorporated. In the case of the copolymer having a butadiene/isoprene weight ratio of 3/97 to 90/10, preferably 5/95 to 85/15, more preferably 10/90 to 80/20, a few gels are formed in heat shaping-processing and the like.

In the invention, the block copolymer before hydrogenation is obtained, for example, by anionic living polymerization in a hydrocarbon solvent using an organic alkali metal compound or the like as an initiator. As the hydrocarbon solvents, there can be used, for example, an aliphatic hydrocarbon such as n-butane, isobutane, n-pentane, n-hexane, n-heptane or n-octane, an alicyclic hydrocarbon such as cyclopentane, methylcyclopentane, cyclohexane, methylcyclohexane, cycloheptane or methylcycloheptane, or an aromatic hydrocarbon such as benzene, toluene, xylene or ethylbenzene. These may be used not only alone, but also as a mixture of two or more thereof.

Further, as the polymerization initiator, there can be used an aliphatic hydrocarbon alkali metal compound, an aromatic hydrocarbon alkali metal compound, an organic aminoalkali metal compound or the like, which are generally known to have anionic polymerization activity to the conjugated diene and the vinyl aromatic compound. The alkali metals include lithium, sodium, potassium and the like, and preferred examples of the organic alkali metal compounds include an aliphatic and aromatic hydrocarbon lithium compounds having 1 to 20 carbon atoms, a compound containing one lithium atom in one molecule and a dilithium, trilithium and tetralithium compounds containing a plurality of lithium atoms in one molecule. Specifically, they include n-propyllithium, n-butyllithium, sec-butyllithium, tert-butyllithium, hexamethylenedilithium, butadienyldilithium, isoprenyldilithium, a reaction product of diisopropenylbenzene and sec-butyllithium, further a reaction product of divinylbenzene, sec-butyllithium and a small amount of 1,3-butadiene, and the like. Further, organic alkali metal compounds disclosed in U.S. Pat. No. 5,708,092, British Patent 2,241,239, U.S. Pat. No. 5,527,753 and the like can also be used. These may be used not only alone, but also as a mixture of two or more thereof.

In the invention, the polymerization temperature in the production of the block copolymer is generally from −10° C. to 150° C., and preferably from 40° C. to 120° C. The time required for polymerization is usually 10 hours or less, and particularly suitably from 0.5 to 5 hours although it varies depending on the conditions. Further, it is desirable to replace the atmosphere of the polymerization system with an inert gas such as nitrogen gas or the like. The polymerization pressure is not particularly limited, and a pressure enough for holding the monomers and solvent in a liquid phase in the above-mentioned polymerization temperature range may be used. Furthermore, it is necessary to pay attention so as not to allow impurities that inactivates the catalyst and living polymer, such as water, oxygen, carbon dioxide, etc. to enter into the polymerization system. The hydrogenated product of the block copolymer of the invention is obtained by hydrogenating the block copolymer before hydrogenation obtained above. A hydrogenation catalyst is not particularly limited, and there is used (1) a support type heterogeneous hydrogenation catalyst in which a metal such as Ni, Pt, Pd or Ru is supported on a carbon, silica, alumina, diatomaceous earth or the like, (2) a so-called Ziegler type hydrogenation catalyst using an organic acid salt of Ni, Co, Fe, Cr or the like or a transition metal salt such as an acetylacetone salt and a reducing agent such as an organoaluminum compound, or (3) a homogeneous hydrogenation catalyst of a so-called organic metal complex such as an organic metal compound of Ti, Ru, Rh, Zr or the like. As the specific hydrogenation catalysts, there can be used hydrogenation catalysts described in JP 42-8704 B, JP 43-6636 B, JP 63-4841 B, JP 1-37970 B, JP 1-53851 B and JP 2-9041 B. The preferred hydrogenation catalysts include a titanocene compound and/or a mixture with a reducing organic metal compound.

As the titanocene compounds, there can be used compounds described in JP 8-109219 A. Specific examples thereof include a compound having at least one ligand having a (substituted) cyclopentadienyl skeleton, an indenyl skeleton or a fluorenyl skeleton, such as biscyclopentadienyltitanium dichloride or monopentamethylcyclopentadienyltitanium trichloride. Further, the reducing organic metal compounds include an organic alkali metal compound such as an organolithium compound, an organomagnesium compound, an organoaluminum compound, an organoboric compound, an organozinc compound or the like.

The hydrogenation reaction is generally conducted within the temperature range of 0 to 200° C., preferably 30 to 150° C. The pressure of hydrogen used in the hydrogenation reaction is recommended to be from 0.1 to 15 MPa, preferably from 0.2 to 10 MPa, and more preferably from 0.3 to 7 MPa. Further, the hydrogenation reaction time is usually from 3 minutes to 10 hours, and preferably from 10 minutes to 5 hours. For the hydrogenation reaction, any one of a batch process, a continuous process and a combination thereof can be used.

In the hydrogenated product of the block copolymer of the invention, the hydrogenation ratio of unsaturated double bonds based on the conjugated diene can be arbitrarily selected depending on the purpose, and is not particularly limited. In order to obtain the block copolymer hydrogenated product having good heat stability and weather resistance, it is recommended that exceeding 70%, preferably 75% or more, more preferably 85% or more and particularly preferably 90% or more of the unsaturated double bonds based on the conjugated diene are hydrogenated. Further, in order to obtain the block copolymer hydrogenated product having good heat stability, it is preferred that the hydrogenation ratio is from 3 to 70% or from 5 to 65%, and particularly preferably from 10 to 60%. Although there is no particular limitation on the hydrogenation ratio of aromatic double bonds based on the vinyl aromatic hydrocarbon in the copolymer, it is preferred that the hydrogenation ratio is 50% or less, preferably 30% or less, and more preferably 20% or less. The hydrogenation ratio can be known by means of a nuclear magnetic resonance apparatus (NMR).

In the invention, the microstructure (the ratio of cis, trans and vinyl) of the conjugated diene moiety in the block copolymer or the hydrogenated product can be arbitrarily changed by the use of the above-mentioned polar compound or the like, and there is no particular limitation thereon. In general, the amount of vinyl bonds can be set within the range of 5 to 90%, preferably 10 to 80%, more preferably 15 to 75%. In the invention, the amount of vinyl bonds is the total amount of 1,2-vinyl bonds and 3,4-vinyl bonds (provided that it is the amount of 1,2-vinyl bonds, when 1,3-butadiene is used as the conjugated diene). The amount of vinyl bonds can be grasped with a nuclear magnetic resonance apparatus (NMR).

In the invention, in order to obtain the block copolymer hydrogenated product particularly excellent in fusion bonding in hot water, preferred is a block copolymer hydrogenated product having a crystallization peak at 20° C. or higher, preferably 30° C. or higher, more preferably within the temperature range of 45 to 100° C., particularly preferably 50 to 90° C., in a differential scanning calorimetry (DSC) chart of the block copolymer hydrogenated product. It is preferred that the heat quantity of crystallization peak is 3 J/g or more, preferably 6 J/g or more, and more preferably 10 J/g or more. The block copolymer hydrogenated product having the crystallization peak can be obtained by setting the amount of vinyl bonds of the block copolymer before hydrogenation to less than 30%, preferably 8 to 25%, more preferably 10 to 25%, and particularly preferably 12 to 20%. In particular, it is recommended that the block copolymer before hydrogenation is allowed to contain at least one conjugated diene polymer segment having an amount of vinyl bonds of 8 to 25%, preferably 10 to 20%, and more preferably 10 to 18%.

The block copolymer of the invention and the hydrogenated product thereof (hereinafter referred to as component (A)) can be used as a block copolymer composition with the vinyl aromatic hydrocarbon polymer (hereinafter referred to as component (B)). The weight ratio of component (A) and component (B) is from 99.9/0.1 to 20/80, preferably 99.7/0.3 to 25/75, and more preferably from 99/1 to 30/70. The block copolymer composition excellent in rigidity, blocking resistance and natural shrinkability can be obtained by combining component (A) and component (B) at such weight ratios. In the invention, as the vinyl aromatic hydrocarbon polymer, there can be used at least one selected from the following a) to c):

a) Styrene polymer,
b) Aliphatic unsaturated carboxylic acid ester-styrene copolymer, and
c) Rubber-modified styrene polymer The styrene polymer a) used in the invention is one obtained by polymerizing styrene or a monomer copolymerizable therewith (provided that b) is excluded). The monomers copolymerizable with styrene include α-methylstyrene, acrylonitrile, maleic anhydride and the like. The styrene polymers include polystyrene, a styrene-α-methylstyrene copolymer, an acrylonitrile-styrene copolymer, a styrene-maleic anhydride copolymer and the like. Particularly preferred examples of the styrene polymers include polystyrene. As for the weight average molecular weight of these styrene polymers, polymers of 50000 to 500000 can be generally used. These styrene polymers can be used either alone or as a mixture of two or more thereof, and utilized as a rigidity improver.

An aliphatic unsaturated carboxylic acid ester of the aliphatic unsaturated carboxylic acid ester-styrene copolymer b) used in the invention is one selected from an ester of a C1 to C12, preferably C2 to C12 alcohol and acrylic acid, such as methyl acrylate, ethyl acrylate, propyl acrylate, butyl acrylate, pentyl acrylate or hexyl acrylate, an ester of methacrylic acid, a C1 to C12, preferably C2 to C12 alcohol and acrylic acid, and mono- or diester of an α- or β-unsaturated dicarboxylic acid such as fumaric acid, itaconic acid or maleic acid and a C1 to C12, preferably C2 to C12 alcohol. The content of the aliphatic unsaturated carboxylic acid ester in such an aliphatic unsaturated carboxylic acid ester-styrene copolymer is generally from 5 to 50% by weight, preferably from 8 to 30% by weight, and more preferably from 10 to 25% by weight. Further, the Vicat softening point of the aliphatic unsaturated carboxylic acid ester-styrene copolymer is recommended to be from 50 to 95° C., preferably from 60 to 90° C., and more preferably from 65 to 85° C. The Vicat softening point is a value measured in accordance with ASTM D-1525 (load: 1 Kg, temperature elevation rate: 2° C./min), using a compression molded product having a thickness of 3 mm as a test piece.

The preferred aliphatic unsaturated carboxylic acid ester-styrene copolymer is a copolymer mainly comprising n-butyl acrylate and styrene, and an aliphatic unsaturated carboxylic acid ester-styrene copolymer in which the total amount of n-butyl acrylate and styrene is 50% by weight or more, and more preferably the total amount of n-butyl acrylate and styrene is 60% by weight or more. A heat shrinkable film using the aliphatic unsaturated carboxylic acid ester-styrene copolymer mainly comprising n-butyl acrylate and styrene has good shrinkability and natural shrinkability.

In b), the above-mentioned vinyl aromatic hydrocarbon other than styrene may be copolymerized within the range in which the characteristics of the invention are maintained. As a method for producing the aliphatic unsaturated carboxylic acid ester-styrene copolymer b), there can be used a known method for producing a styrene resin, for example, a bulk polymerization method, a solution polymerization method, a suspension polymerization method, an emulsion polymerization method or the like. As for the weight average molecular weight of these aliphatic unsaturated carboxylic acid ester-styrene copolymers, polymers of 50000 to 500000 can be generally used.

The rubber-modified styrene polymer c) used in the invention is obtained by polymerizing a mixture of a monomer copolymerizable with the vinyl aromatic hydrocarbon and an elastomer, and as a polymerization method, there has been generally conducted suspension polymerization, emulsion polymerization, bulk polymerization, bulk-suspension polymerization or the like. The monomers copolymerizable with the vinyl aromatic hydrocarbons include α-methylstyrene, acrylonitrile, an acrylate, a methacrylate, maleic anhydride and the like. Further, as the copolymerizable elastomer, there is used natural rubber, synthetic isoprene rubber, butadiene rubber, styrene-butadiene rubber, high styrene rubber or the like.

These elastomers are dissolved generally in an amount of 3 to 50 parts by weight per 100 parts by weight of the vinyl aromatic hydrocarbon or the monomer copolymerizable therewith or made into a latex form, and subjected to emulsion polymerization, bulk polymerization, bulk-suspension polymerization or the like. Particularly preferred examples of the rubber-modified styrene polymers include an impact-resistant rubber-modified styrene polymer (HIPS). The rubber-modified styrene polymer can be utilized as an improver for rigidity, impact resistance and slipperiness. As for the weight average molecular weight of these rubber-modified styrene polymers, polymers of 50000 to 500000 can be generally used. The amount of the rubber-modified styrene polymer added is preferably from 0.1 to 10 parts by weight, taking into account the maintenance of transparency.

The vinyl aromatic hydrocarbon polymer used in the invention is recommended to have an MFR (under conditions G, temperature: 200° C., load: 5 Kg) from 0.1 to 100 g/10 min, preferably from 0.5 to 50 g/10 min, and from 1 to 30 g/10 min, in respect to molding processability.

At least one selected from a fatty acid amide, a paraffin and a hydrocarbon resin, and a fatty acid is added as a lubricant to the block copolymer, hydrogenated product thereof and block copolymer composition of the invention in an amount of 0.01 to 5 parts by weight, preferably 0.05 to 4 parts by weight, more preferably 0.1 to 3 parts by weight, per 100 parts by weight of the block copolymer or the hydrogenated block copolymer, thereby improving blocking resistance.

The fatty acid amides include stearoamide, oleyl•amide, erucyl•amide, behen•amide, a mono- or bisamide of a higher fatty acid, ethylenebis•stearoamide, stearyl•oleylamide, N-stearyl•erucamide and the like. These can be used either alone or as a mixture of two or more thereof. The paraffins and hydrocarbon resins include paraffin wax, microcrystalline wax, fluid paraffin, paraffinic synthetic wax, polyethylene•wax, combined wax, montan wax, hydrocarbon wax, silicone oil and the like. These can be used either alone or as a mixture of two or more thereof.

The fatty acids include a saturated fatty acid, an unsaturated fatty acid, an N-substituted fatty acid and the like, that is, a saturated fatty acid such as lauric acid, palmitic acid, stearic acid, behenic acid or hydroxystearic acid, an unsaturated fatty acid such as oleic acid, erucic acid or ricinolic acid, a substituted fatty acid such as N-stearylstearic acid, N-oleyloleic acid, N-stearyloleic acid, N-oleylstearic acid, N-stearylerucic acid, N-oleylpalmitic acid, methylolstearic acid or methylolbehenic acid, a saturated fatty acid such as methylenebisstearic acid, ethylenebiscapric acid, ethylenebislauric acid, ethylenebisstearic acid, ethylenebisisostearic acid, ethylenebishydroxystearic acid, ethylenebisbehenic acid, hexamethylenebishydroxystearic acid, N,N'-distearyladipic acid or N,N'-distearylsebacic acid, an unsubstituted fatty acid such as ethylenebisoleic acid, hexamethylenebisoleic acid, N,N'-dioleyladipic acid or N,N'-dioleylsebacic acid, m-xylylenebisstearic acid, N,N'-distearylisophthalic acid and the like. These can be used either alone or as a mixture of two or more thereof.

At least one ultraviolet absorber and light stabilizer selected from a benzophenone-based ultraviolet absorber, a benzotriazole-based ultraviolet absorber and a hindered amine-based light stabilizer is added as an ultraviolet absorber and a light stabilizer to the block copolymer, hydrogenated product thereof and block copolymer composition of the invention in an amount of 0.05 to 3 parts by weight, preferably 0.05 to 2.5 parts by weight, more preferably 0.1 to 2 parts by weight, per 100 parts by weight of the block copolymer or the hydrogenated block copolymer, thereby improving light resistance.

The benzophenone-based ultraviolet absorbers include 2,4-dihydroxy•benzophenone, 2-hydroxy-4-methoxy•benzophenone, 2-hydroxy-4-n-octoxy•benzophenone, 4-hydroxy-2-hydroxy•benzophenone, 1,4-bis(4-benzoyl-3-hydroxyphenoxy)butane, 1,6-bis(4-benzoyl-3-hydroxyphenoxy)hexane and the like.

The benzotriazole-based ultraviolet absorbers include 2-(2'-hydroxy-5'-methyl-phenyl)benzotriazole, 2-(2'-hydroxy-3',5'-di-t-butyl-phenyl)benzotriazole, 2-(2'-hydroxy-3'-t-butyl-5'-methyl-phenyl)-5-chloro•benzotriazole, 2-(2'-hydroxy-3',5'-di-t-butyl-phenyl)-5-chloro•benzotriazole, 2-(2-hydroxy-4-octyloxyphenyl)-2H-benzotriazole, 2-(2H-benzotriazole-2-yl)-4-methyl-6-(3,4,5,6-tetrahydro-phthalimidylmethyl)phenol and the like.

The hindered amine-based light stabilizers include bis(2, 2,6,6-tetramethyl-4-piperidyl) sebacate, bis-(1,2,6,6,6,-pentamethyl-4-piperidyl)sebacate, 1-[2-{3-(3,5-di-tertiary butyl-4-hydroxyphenyl)propionyloxy}-ethyl]-4-{3-(3,5-di-tertiary butyl-4-hydroxyphenyl)-propionyloxy}-2,2,6,6-tetramethylpiperidine, 8-acetyl-3-dodecyl-7,7,9,9-tetramethyl-1,3,8-triazaspiro[4,5]decane-2,4-dione, 4-benzoyloxy-2,2,6, 6-tetramethylpiperidine, poly[[6-1,1,3,3-tetramethylbutyl) imino-1,3,5-triazine-2,4-diyl][(2,2,6,6-tetramethyl-4-piperidyl)imino]hexamethylene[[2,2,6,6-tetramethyl-4-piperidyl]imino]], poly[6-morpholino-s-triazine-2,4-diyl][2, 2,6,6-tetramethyl-4-piperidyl)imino]-hexamethylene[(2,2,6, 6-tetramethyl-4-piperidyl)imino]], 2-(3,5-di-tertiary butyl-4-hydroxybenzyl)-2-n-butylmalonic acid bis(1,2,2,6,6-pentamethyl-4-piperidyl) and the like.

2-[1-(2-Hydroxy-3,5-di-t-pentylphenyl)ethyl]-4,6-di-t-pentylphenyl acrylate is added as a stabilizer to the block copolymer, hydrogenated product thereof and block copolymer composition of the invention in an amount of 0.05 to 3 parts by weight, more preferably 0.1 to 2 parts by weight, per 100 parts by weight of the block copolymer or the hydrogenated block copolymer, thereby being able to obtain a gel inhibiting effect. When the stabilizer is less than 0.05 parts by weight, no gel inhibition effect is obtained, and addition exceeding 3 parts by weight results in no contribution to the gel inhibition effect higher than that of the invention.

At least one of phenolic stabilizers such as n-octadecyl-3-(3,5-di-t-butyl-4-hydroxyphenyl)propionate, 2-t-butyl-6-(3-t-butyl-2-hydroxy-5-methylbenzyl)-4-methyl-phenyl acrylate, 2,4-bis[(octylthio)methyl]-o-cresol, tetrakis[methylene-3-(3,5-di-t-butyl-4-hydroxyphenyl) propionate]methane, 1,3,5-trimethyl-2,4,6-tris(3,5-di-t-butyl-4-hydroxybenzyl) benzene and 2,4-bis-(n-octylthio)-6-(4-hydroxy-3,5-di-t-butylanilino)-1,3,5-triazine can be added in an amount of 0.05 to 3 parts by weight per 100 parts by weight of the block copolymer, and at least one of organic phosphate- and organic phosphite-based stabilizers such as tris-(nonylphenyl)phosphite, 2,2-methylenebis(4,6-di-t-butylphenyl) octylphosphite, 2-[[2,4,8,10-tetrakis(1,1-dimethylethyl)dibenzo[d,f][1,3,2] dioxaphosphepin-6-yl]oxy]-N,N-bis[2-[[2,4,8,10-tetrakis(1, 1-dimethylethyl)dibenzo[d,f][1,3,2]dioxaphosphepin-6-yl] oxy]ethyl]ethaneamine and tris(2,4-di-t-butylphenyl) phosphite can be added in an amount of 0.05 to 3 parts by weight per 10 parts by weight of the block copolymer or the hydrogenated block copolymer.

Various polymers and additives can be added to the block copolymer, hydrogenated product thereof and block copolymer composition of the invention depending on the purpose. Suitable examples of the polymers include a block copolymer elastomer of a vinyl aromatic hydrocarbon and a conjugated diene or a hydrogenated product thereof, a block copolymer resin of a vinyl aromatic hydrocarbon and a conjugated diene, different from the block copolymer of the invention, and the like.

In the invention, as the block copolymer elastomer of a vinyl aromatic hydrocarbon and a conjugated diene or the hydrogenated product thereof, there can be used one having a vinyl aromatic hydrocarbon content of less than 60% by weight, preferably from 10 to 50% by weight, and having a structure similar to that of the block copolymer of the invention. It is blended in an amount of 0.5 to 30 parts by weight, preferably from 1 to 20 parts by weight, per 100 parts by weight of the block copolymer of the invention, thereby being able to improve impact resistance, elongation and the like.

In the hydrogenated product of the block copolymer elastomer, the hydrogenation ratio of unsaturated double bonds based on the conjugated diene can be arbitrarily selected depending on the purpose, and is not particularly limited. 70% or more, preferably 80% or more, more preferably 90% or more of the unsaturated double bonds based on the conjugated diene in the block copolymer elastomer may be hydrogenated, or only a part thereof may be hydrogenated. When only a part is hydrogenated, it is preferred that the hydrogenation ratio is adjusted to 10% to less than 70%, or 15% to less than 65%, and 20% to less than 60% as needed.

As the block copolymer resin of a vinyl aromatic hydrocarbon and a conjugated diene, which is different from the block copolymer of the invention or the hydrogenated product thereof, there can be used one having a vinyl aromatic hydrocarbon content of 60 to 95% by weight, preferably from 65 to 90% by weight, and having a structure similar to that of the block copolymer of the invention. It is blended in an amount of 5 to 90 parts by weight, preferably from 10 to 80 parts by weight, per 100 parts by weight of the block copolymer of the invention, thereby being able to improve impact resistance, rigidity, elongation and the like.

The other suitable additives include a softening agent such as a coumarone-indene resin, a terpene resin or an oil, and a plasticizer. Further, various stabilizers, pigments, antiblocking agents, antistatic agents, lubricants and the like can also be added. As the blocking agent, the antistatic agent and the lubricant, there can be used, for example, a fatty acid amide, ethylenebis(stearoamide), sorbitan monostearate, a saturated fatty acid ester of a fatty acid alcohol, a pentaerythritol fatty acid ester and the like, and as the ultraviolet absorber, there can be used compounds described in *Practical Handbook of Additives for Plastics and Rubbers* (Kagaku Kogyosha), such as p-t-butylphenyl salicylate, 2-(2'-hydroxy-5'-methylphenyl)benzotriazole, 2-(2'-hydroxy-3'-t-butyl-5'-methylphenyl)-5-chlorobenzotriazole and 2,5-bis-[5'-t-butylbenzoxazolyl-(2)]thiophene. These are used generally within the range of 0.01 to 5% by weight, preferably within the range of 0.05 to 3% by weight.

The block copolymer of the invention, the hydrogenated product thereof, or the block copolymer composition comprising the block copolymer and the vinyl aromatic hydrocarbon polymer can be used as various forming materials and the like for sheets, films, injection molded products and the like.

A heat shrinkable uniaxially or biaxially stretched film using the block copolymer of the invention, the hydrogenated product thereof, or the block copolymer composition comprising the block copolymer and the vinyl aromatic hydrocarbon polymer can be obtained by extrusion molding the block copolymer through an ordinary T-die or circular die in a flat or tube form at 150 to 250° C., preferably 170 to 220° C., and substantially uniaxially or biaxially stretching the resulting unstretched product.

For example, in uniaxial stretching, stretching is carried out in an extrusion direction with a calender roll or the like, in the case of a film form or a sheet form, or in a rectangular direction to the extrusion direction with a tenter or the like. In the case of a tube form, stretching is carried out in an extrusion direction or circumferential direction of a tube. In biaxial stretching, an extruded film or sheet is longitudinally stretched with a metal roll or the like, and then laterally stretched with a tenter or the like, in the case of a film form or a sheet form. In the case of a tube form, stretching is carried out in an extrusion direction of a tube and in a circumferential direction of a tube, that is, in rectangular directions to a tube axis, at the same time or separately.

In the invention, it is preferred that stretching is carried out at a stretching temperature of 60 to 110° C., preferably 80 to 100° C., longitudinally and/or laterally at a stretching ratio of 1.5 to 8, preferably 2 to 6. When the stretching temperature is less than 60° C., breakage occurs to cause the difficulty to obtain a desired heat shrinkable film. Exceeding 110° C. results in the difficulty to obtain a film having good shrinkage characteristics. The stretching ratio is selected within the above-mentioned range so as to correspond to the required shrinkage ratio depending on the application. However, when the stretching ratio is less than 1.5, the heat shrinkage ratio is unfavorably low for heat shrink packaging. Further, a stretching ratio exceeding 8 is unfavorable in respect to stable production in a stretching processing process. In the case of biaxial stretching, the longitudinal and lateral stretching ratios may be the same or different. Then, it is also possible that a heat shrinkable film uniaxially or biaxially stretched is heat treated at 60 to 105° C., preferably at 80 to 95° C., for a short period of time, for example, for 3 to 60 seconds, preferably 10 to 40 seconds, as needed, thereby conducting a means for preventing natural shrinkage at room temperature.

In order to use the heat shrinkable film thus obtained as a material for heat shrink packaging or a material for a heat shrinkable label, the heat shrinkage ratio at 65° C. in a stretching direction is recommended to be from 5 to 60%, preferably from 10 to 55%, and more preferably from 15 to 50%. When the heat shrinkage ratio is within such a range, a heat shrinkable film excellent in a balance between the heat shrinkage ratio and the natural shrinkage ratio is obtained. In the invention, the heat shrinkage ratio at 65° C. is a measure of low-temperature shrinkability, and the heat shrinkage ratio in each stretching direction of a formed article at the time when the uniaxially or biaxially stretched film is immersed in a heat medium not inhibiting the characteristics of the formed article, such as hot water, silicone oil, glycerol or the like at 65° C. for 5 minutes. In the invention, within the above-mentioned range of the heat shrinkage ratio, the natural shrinkage ratio of the heat shrinkable film itself is recommended to be 2.5% or less, preferably 2.0% or less, and more preferably 1.5% or less. The natural shrinkage ratio of the heat shrinkable film itself as used herein means a value obtained by allowing the heat shrinkable film within the above-mentioned range of heat shrinkage to stand at 35° C. for 5 hours, and calculating by an equation described later.

Further, in the uniaxially or biaxially stretched film of the invention, it is necessary as a heat shrink packaging material that the tensile elastic modulus in the stretching direction is from 7000 to 30000 Kg/cm$^2$, and preferably from 10000 to 25000 Kg/cm$^2$. When the tensile elastic modulus in the stretching direction is less than 7000 Kg/cm$^2$, settling occurs in a shrink packaging process to unfavorably cause abnormal packaging. Exceeding 30000 Kg/cm$^2$ is unfavorable because the impact resistance of the film decreases.

When the uniaxially or biaxially stretched film of the invention is used as the heat shrinkable packaging material, it can be heat shrunk by heating at a temperature of 130 to 300° C., preferably 150 to 250° C., for several seconds to several minutes, preferably 1 to 60 seconds.

The heat shrinkable film of the invention may be a multilayer laminate having at least two-layer, preferably at least three-layer structure. Specific examples of types of usage as the multilayer laminates include, for example, types disclosed in JP 3-5306 B. The block copolymer, hydrogenated block copolymer or block copolymer composition of the invention may be used in an intermediate layer or both outer layers. When the block copolymer, hydrogenated product thereof or block copolymer composition of the invention are used in the multilayer film, there is no particular limitation on a layer other than the film layer using the block copolymer, hydrogenated product thereof or block copolymer composition of the invention. It may be a layer comprising the block copolymer, hydrogenated product thereof or block copolymer composition of the invention different in constituting components, composition or the like, or a layer in which a block copolymer other than the invention is combined with a composition of a block copolymer other than the invention and the above-mentioned vinyl aromatic hydrocarbon polymer. In addition, there is mentioned at least one component selected from polypropylene, polyethylene, an ethylenic polymer (an ethylene-vinyl acetate copolymer, an ethylene-ethyl acrylate copolymer, an ethylene-acrylic acid copolymer or the like), an ionomer resin, a nylon-based resin, a polyester-based resin, a polymethyl methacrylate resin, an ABS resin, the above-mentioned vinyl aromatic hydrocarbon polymer and the like. However, preferred is the block copolymer other than the invention or the composition of the block copolymer other than the invention and the above-mentioned vinyl aromatic hydrocarbon polymer, or the above-mentioned vinyl aromatic hydrocarbon polymer.

In the invention, the preferred heat shrinkable multilayer film is a heat shrinkable multilayer film having a layer comprising the block copolymer, hydrogenated product thereof or block copolymer composition of the invention as at least one layer of the multilayer film, wherein the heat shrinkage ratio at 80° C. in the stretching direction is from 10 to 80%, preferably from 15 to 70%, and more preferably from 20 to 60%. The block copolymer or the hydrogenated product thereof used in such a heat shrinkable multilayer film is preferably a block copolymer or a hydrogenated product thereof which satisfies the requirements specified in the invention, has at least two peaks within the molecular weight (molecular weight in terms of polystyrene) range of 40000 to 300000, preferably 45000 to 280000, more preferably 50000 to 280000, in the gel permeation chromatography (GPC) measurement, and has at least one tan δ peak temperature within the temperature range of 90 to 125° C., preferably 92 to 123° C., more preferably 95 to 120° C., in the dynamic viscoelasticity measurement, thereby obtaining the heat shrinkable multilayer film excellent in natural shrinkability and resistance to fusion bonding in hot water.

In the invention, function tan δ in the dynamic viscoelasticity measurement is a value measured with a viscoelasticity measuring analyzer, DVE-V4, manufactured by Rheology Co., Ltd., and is measured under the conditions of an oscillation frequency of 35 Hz and a temperature elevation rate of 3° C./min using a test piece having a thickness of 0.5 to 2 mm. The temperature showing the peak means a temperature at which the primary differentiated value of the variation of the value of tan δ to the temperature becomes zero. The peak temperature of tan δ is adjusted by the weight ratio of the vinyl aromatic hydrocarbon and the conjugated diene, the molecular weight of the block copolymer, the content of the vinyl aromatic hydrocarbon polymer blocks in the block copolymer, the content of short-chain vinyl aromatic hydrocarbon polymer moieties with a vinyl aromatic hydrocarbon unit number of 1 to 3 in the block copolymer, etc.

The block copolymer of the invention or the hydrogenated product thereof suitably available in the heat shrinkable multilayer film has at least 2 peaks within the molecular weight range of 40000 to 300000, thereby being excellent in a balance among physical properties such as rigidity and impact resistance. Such a block copolymer or the hydrogenated product thereof can be obtained by mixing the block copolymers different in the composition of the vinyl aromatic hydrocarbon and the conjugated diene and the molecular weight, or conducting polymerization in the same reaction vessel, adjusting the molecular weight. As adjustment of the molecular weight in the same reaction vessel, there is a method of adding an initiator more than once, a method of adding a multifunctional coupling agent to ends having polymerization activity, a method of partly inactivating active ends during polymerization, or the like. When the active ends are partly inactivated during polymerization, a method of adding an active hydrogen-containing compound such as an alcohol, a phenol compound, a carboxylic-acid, an amine compound or water, a ketone compound or an epoxy compound is generally used.

As for the ratio of components which exist in the above-mentioned block copolymer or the hydrogenated product thereof suitably applicable in the heat shrinkable multilayer film and show at least two peaks, it is preferred that the weight rate of a component showing the maximum molecular weight and other components is 10/90 to 90/10, preferably 20/80 to 80/20, and more preferably 70/30 to 30/70. The weight rate of these can be grasped by the weight ratio of the respective components mixed when they are mixed, and can be grasped by polymerization conditions thereof when they are polymerized in the same reaction vessel. Further, it can also be grasped from the area ratio of the respective components in a gel permeation chromatogram.

As the heat shrinkable multilayer film of the invention, there can also be obtained a heat shrinkable multilayer film in which the heat shrinkage ratio at 65° C. in the stretching direction is from 5 to 60%, preferably from 10 to 55%, and more preferably from 15 to 50%, and the tensile elastic modulus in the stretching direction is from 7000 to 30000 Kg/cm², and preferably from 10000 to 25000 Kg/cm².

The thickness of the heat shrinkable film and heat shrinkable multilayer film of the invention is from 10 to 300 μm, preferably from 20 to 200 μm, and more preferably from 30 to 100 μm, and the thickness ratio of an inner layer and both surface layers is recommended to be from 5/95 to 45/55, and preferably from 10/90 to 35/65.

The heat shrinkable film of the invention can be utilized for various applications, for example, packages of fresh food and confectionery, packages of clothes, writing materials and the like, and the like. The particularly preferred applications include utilization as a so-called material for a heat shrinkable label, in which letters or designs are printed on the uniaxially stretched film of the block copolymer specified in the invention, and then, the film is closely adhered by heat shrinkage to a surface of an article to be packaged, such as a plastic molded article, a metal product, a glass vessel or a porcelain to use.

In particular, the uniaxially stretched heat shrinkable film of the invention is excellent in low-temperature shrinkability, rigidity and natural shrinkability, so that it can be suitably utilized as a heat shrinkable label material for a material extremely different from the block copolymer of the invention in the coefficient of thermal expansion, water absorption properties or the like, for example, a vessel using at least one selected from a metal, a ceramic, glass, paper, a polyolefinic resin such as polyethylene, polypropylene or polybutene, a polymethacrylate resin, a polycarbonate resin, a polyester resin such as polyethylene terephthalate or polybutylene terephthalate and a polyamide resin, as a constituent material, as well as the heat shrinkable label material for the plastic molded article so as to deform on heating at high temperatures.

The materials constituting plastic vessels for which the heat shrinkable film of the invention include polystyrene, rubber-modified high-impact polystyrene (HIPS), a styrene-butyl acrylate copolymer, a styrene-acrylonitrile copolymer, a styrene-maleic anhydride copolymer, an acrylonitrile-butadiene-styrene copolymer (ABS), a methacrylate-butadiene-styrene copolymer (MBS), a polyvinyl chloride resin, a polyvinyl chloride resin, a phenol resin, a urea resin, a melamine resin, an epoxy resin, an unsaturated polyester resin, a silicone resin and the like, as well as the above-mentioned resins. These plastic vessels may be either a mixture of two or more of the resins or a laminate.

When the heat shrinkable film of the invention is used as the material for a heat shrinkable label, the heat shrinkage ratio at 65° C. in a rectangular direction to the stretching direction is less than 20%, and preferably 10% or less. Accordingly, the uniaxial stretching for the heat shrinkable label in the invention means to conduct stretching treatment so as to provide a heat shrinkage ratio at 65° C. in the stretching direction of 5 to 60% and a heat shrinkage ratio in a rectangular direction to the stretching direction of less than 20%

EXAMPLES

Examples of the invention are described below, but these should not be construed as limiting the scope of the invention.

Table 1, Table 2, Table 5, Table 6 and Table 7 show block copolymers, Table 3 shows styrene-n-butyl acrylate copolymers and general-purpose polystyrene as vinyl aromatic hydrocarbon polymers, and Table 7 shows a styrene-n-butyl acrylate copolymer, a styrene-methyl methacrylate copolymer, high-impact polystyrene (HIPS) and general-purpose polystyrene.

(Preparation of Block Copolymer A-1 to A-11)

Block copolymers having styrene contents (% by weight), block rates (% by weight) and block styrene molecular weights shown in Table 1 and Table 2 were produced in a cyclohexane solvent using n-butyllithium as a catalyst and tetramethylethylenediamine as a randomizing agent. The styrene content was adjusted by the amounts of styrene and butadiene (including isoprene when isoprene is contained) added, the block rate was adjusted by the styrene contents of segment A and segment B, and the molecular weight of block styrene was adjusted by the styrene contents of segment A and segment B and the content ratio. In the preparation of the block copolymer, monomers diluted with cyclohexane to a concentration of 20% by weight were used.

As the hydrogenation catalyst, there was used a hydrogenation catalyst obtained by putting 1 liter of dried purified cyclohexane in a nitrogen-substituted reaction vessel, adding 100 mmol of bis(η5-cyclopentadienyl)titanium dichloride, and adding an n-hexane solution containing 200 mmol of trimethylaluminum with thoroughly stirring, followed by reaction at room temperature for about 3 days.

1) Block Copolymer A-1

Using an autoclave equipped with a stirrer, 0.049 part by weight of n-butyllithium and 0.03 part by weight of tetramethylethylenediamine were added to a cyclohexane solution containing 12.5 parts by weight of 1,3-butadiene under an atmosphere of nitrogen gas, and polymerization was conducted at 75° C. for 15 minutes. Then, a cyclohexane solution containing 13.2 parts by weight of styrene and 1.5 parts by weight of 1,3-butadiene was continuously added for 10 minutes, and polymerization was conducted at 75° C., followed by keeping for 5 minutes. This process was repeated 5 times. Then, methanol was added in an amount of 0.3 time the molar quality of n-butyllithium, and then, a cyclohexane solution containing 14 parts by weight of styrene was added, followed by polymerization at 75° C. for 20 minutes. Thereafter, methanol was added to a reaction device in an amount of 0.6 time the molar quality of n-butyllithium to stop the polymerization, and 2-[1-(2-hydroxy-3,5-di-t-pentylphenyl)ethyl]-4,6-di-t-pentylphenyl acrylate was added as a stabilizer in an amount of 0.6 part by weight per 100 parts by weight of the block copolymer composition, followed by desolvation to obtain a block copolymer.

2) Block Copolymers A-2 to A-5

Block copolymers A-2 to A-5 were prepared in a similar manner as with A-1.

3) Block Copolymer A-6

Block copolymer A-6 comprised two types of component 1 and component 2 different in composition, and was produced as follows.

As for component 1, using an autoclave equipped with a stirrer, 0.041 part by weight of n-butyllithium and 0.03 part by weight of tetramethylethylenediamine were added to a cyclohexane solution containing 12 parts by weight of styrene under an atmosphere of nitrogen gas, and polymerization was conducted at 75° C. for 20 minutes. Then, a cyclohexane solution containing 50 parts by weight of styrene, 10 parts by weight of 1,3-butadiene and 15 parts by weight of isoprene was continuously added for 10 minutes, and polymerization was conducted at 75° C., followed by keeping for 30 minutes. Then, a cyclohexane solution containing 25 parts by weight of styrene was added, followed by polymerization at 75° C. for 20 minutes. Thereafter, methanol was added to a reaction device in an amount of 0.9 time the molar quality of n-butyllithium to stop the polymerization.

As for component 2, using an autoclave equipped with a stirrer, 0.09 part by weight of n-butyllithium and 0.02 part by weight of tetramethylethylenediamine were added to a cyclohexane solution containing 8 parts by weight of styrene under an atmosphere of nitrogen gas, and polymerization was conducted at 75° C. for 15 minutes. Then, a cyclohexane solution containing 40 parts by weight of styrene, 12.8 parts by weight of 1,3-butadiene and 19.2 parts by weight of isoprene was continuously added for 5 minutes, followed by keeping at 75° C. for 30 minutes. Then, a cyclohexane solution containing 20 parts by weight of styrene was added, followed by polymerization at 75° C. for 20 minutes. Thereafter, methanol was added to a reaction device in an amount of 0.9 time the molar quality of n-butyllithium to stop the polymerization.

Component 1 and component 2 were mixed at a weight ratio of 60/40, and then, 2-[1-(2-hydroxy-3,5-di-t-pentylphenyl)ethyl]-4,6-di-t-pentylphenyl acrylate was added as a stabilizer in an amount of 0.6 part by weight per 100 parts by weight of the block copolymer composition, followed by desolvation to obtain block copolymer A-6.

4) Block Copolymers A-7 and A-8

Block copolymers A-7 and A-8 were prepared in a similar manner as with block copolymer A-6.

5) Block Copolymer A-9

Using an autoclave equipped with a stirrer, 0.070 part by weight of n-butyllithium and 0.03 part by weight of tetramethylethylenediamine were added to a cyclohexane solution containing 15 parts by weight of styrene under an atmosphere of nitrogen gas, and polymerization was conducted at 75° C. for 20 minutes. Then, a cyclohexane solution containing 1 part by weight of 1,3-butadiene and 15 parts by weight of styrene was added for 1 minute, and polymerization was further conducted at 75° C. for 20 minutes. Then, a cyclohexane solution containing 20 parts by weight of styrene, 14 parts by weight of 1,3-butadiene and 16 parts by weight of isoprene was continuously added for 30 minutes, and polymerization was conducted at 75° C. Then, a cyclohexane solution containing 1 part of 1,3-butadiene and 18 parts by weight of styrene was continuously added at 75° C. for 20 minutes, and polymerization was conducted. Thereafter, methanol was added to a reaction device in an amount of 0.9 time the molar quality of n-butyllithium to stop the polymerization, and 2-[1-(2-hydroxy-3,5-di-t-pentylphenyl)ethyl]-4,6-di-t-pentylphenyl acrylate was added as a stabilizer in an amount of 0.6 part by weight per 100 parts by weight of the block copolymer composition, followed by desolvation to obtain a block copolymer.

6) Block Copolymer A-10

Using an autoclave equipped with a stirrer, a cyclohexane solution containing 20 parts by weight of styrene and 0.135 part by weight of n-butyllithium based on 100 parts by weight of the total used monomers were added under an atmosphere of nitrogen gas, and polymerization was conducted at 75° C. for 30 minutes. Then, a cyclohexane solution containing 15 parts by weight of 1,3-butadiene was added, and polymerization was conducted at 75° C. for 30 minutes. Thereafter, a cyclohexane solution containing 15 parts by weight of styrene was added, and polymerization was conducted at 75° C. for 30 minutes. Then, a cyclohexane solution containing tetramethylethylenediamine in an amount of 0.2 time the molar quality of n-butyllithium previously added. Thereafter, a cyclohexane solution containing 20 parts of styrene and 10 parts by weight of 1,3-butadiene was continuously added for 10 minutes, and polymerization was conducted at 75° C., followed by keeping for 30 minutes. Then, methanol was added in an amount of 0.7 time the molar quality of n-butyllithium, and thereafter, a cyclohexane solution containing 20 parts by weight of styrene was added, followed by polymerization at 75° C. for 30 minutes.

Then, a hydrogenation catalyst was added to a solution of the block copolymer obtained above in an amount of 100 ppm as titanium based on 100 parts by weight of the block copolymer, and hydrogenation reaction was conducted under a hydrogen pressure of 0.7 MPa at a temperature of 65° C. Thereafter, methanol was added, and then, octadecyl-3-(3,5-di-t-butyl-4-hydroxyphenyl) propionate was added as a stabilizer in an amount of 0.3 part by weight per 100 parts by weight of the block copolymer.

Characteristics of the resulting block copolymer A-10 are shown in Table 4. The hydrogenation ratio of block copolymer A-10 was 98%, the crystallization peak temperature was 60° C., and the heat quantity of crystallization peak was 16.5 J/g.

7) Block Copolymer A-11

A block copolymer mixture was obtained in the same manner as with block copolymer A-6 with the exception that the amounts of n-butyllithium used in the preparation of component 1 and component 2 of block copolymer A-6 were changed.

Then, a hydrogenation catalyst was added to a solution of the block copolymer mixture obtained above in an amount of 100 ppm as titanium based on 100 parts by weight of the block copolymer, and hydrogenation reaction was conducted under a hydrogen pressure of 0.7 MPa at a temperature of 65° C. Thereafter, methanol was added, and then, octadecyl-3-(3,5-di-t-butyl-4-hydroxyphenyl) propionate was added as a stabilizer in an amount of 0.3 part by weight per 100 parts by weight of the block copolymer.

Characteristics of the resulting block copolymer A-11 are shown in Table 4. The hydrogenation ratio of block copolymer A-11 was adjusted by the amount of hydrogen so as to give a hydrogenation ratio of about 35%, and was about 35%.

(Preparation of Block Copolymers C-1 to C-19 and D-1)

Block copolymers used in Examples which have at least one polymer block mainly comprising a vinyl aromatic hydrocarbon, at least one polymer block comprising a conjugated diene, and at least one polymer block comprising a conjugated diene and an vinyl aromatic hydrocarbon are shown in Table 5, Table 6 and Table 7. The block copolymers were obtained by adding n-butyllithium as a polymerization initiator in cyclohexane, adding tetramethylethylenediamine as a randomizing agent for adjustment of the content of short-chain styrene as needed, and conducting polymerization. In the preparation of the block copolymers, monomers diluted with cyclohexane to a concentration of 20% by weight were used.

8) Block Copolymer C-1

Block copolymer C-1 was produced in the following manner.

<Low Molecular Weight Block Copolymer Moiety>

Using an autoclave equipped with a stirrer, 0.088 part by weight of n-butyllithium and 0.03 part by weight of tetramethylethylenediamine were added to a cyclohexane solution containing 35 parts by weight of styrene under an atmosphere of nitrogen gas, and polymerization was conducted at 75° C. for 25 minutes. Thereafter, a cyclohexane solution containing 10 parts by weight of styrene, 10 parts by weight of 1,3-butadiene and 7 parts by weight of isoprene was continuously added, and polymerization was conducted at 75° C. for 45 minutes. Then, a cyclohexane solution containing 38 parts by weight of styrene was continuously added, and polymerization was conducted at 75° C. for 25 minutes.

<High Molecular Weight Block Copolymer Moiety>

Using an autoclave equipped with a stirrer, 0.043 part by weight of n-butyllithium and 0.03 part by weight of tetramethylethylenediamine were added to a cyclohexane solution containing 35 parts by weight of styrene under an atmosphere of nitrogen gas, and polymerization was conducted at 75° C. for 25 minutes. Thereafter, a cyclohexane solution containing 10 parts by weight of styrene, 10 parts by weight of 1,3-butadiene and 7 parts by weight of isoprene was continuously added, and polymerization was conducted at 75° C. for 45 minutes. Then, a cyclohexane solution containing 38 parts by weight of styrene was continuously added, and polymerization was conducted at 75° C. for 25 minutes.

Polymerization solutions of the above-mentioned low molecular weight block copolymer moiety and high molecular weight block copolymer moiety were mixed at a weight ratio of 50/50. Thereafter, methanol was added in an amount of 0.9 time the molar quality of n-butyllithium to stop the polymerization, and 2-t-amyl-6-[1-(3,5-di-t-amyl-2-hydroxyphenyl)ethyl]-4-t-amylphenyl acrylate was added as a stabilizer in an amount of 0.6 part by weight per 100 parts by weight of the block copolymer composition, followed by desolvation to obtain block copolymer C-1.

9) Block Copolymers C-2 to C-9 and D-1

Block copolymers C-2 to C-9 and D-1 were prepared in a similar manner as with C-1.

(Preparation of Aliphatic Unsaturated Carboxylic Acid Ester-Styrene Copolymer)

Styrene-n-butyl acrylate copolymers B-1, B-2 and D-2 and styrene-methyl methacrylate copolymer D-3 were produced by adding 5 kg of styrene and n-butyl acrylate or methyl methacrylate at a ratio shown in Table 2 and Table 7 to a 10-liter autoclave equipped with a stirrer, concurrently putting 0.3 kg of ethylbenzene and 1 kg of 1,1-bis(t-butylperoxy) cyclohexane for adjusting the MRF, conducting polymerization at 110 to 150° C. for 2 to 10 hours, and then, recovering unreacted styrene, n-butyl acrylate, methyl methacrylate and ethyl benzene with a vent extruder. B-1 thus obtained had an MRF of 3.0 g/10 min, B-2 had an MRF of 2.6 g/10 min, D-2 had an MRF of 3.4 g/10 min, and D-3 had an MRF of 3.1 g/10 min.

(Methods for Measurement and Evaluation)

Measurement and evaluation described in Examples and Comparative Examples were made by the following methods:

1) Styrene Content

The styrene content of a block copolymer or a hydrogenated block copolymer was measured using an ultraviolet spectrophotometer (device name: UV-2450; manufactured by Shimadzu Corporation.

2) Block Styrene Content and Block Rate

The block styrene content was measured by a method of subjecting a block copolymer before hydrogenation to oxidative degradation using t-butyl hydroperoxide in the presence of osmium tetraoxide as a catalyst (a method described in I. M. KOLTHOFF, et al., *J. Polym. Sci.*, 1, 429 (1946)). Further, the block rate was determined from the following equation, using vinyl aromatic hydrocarbon polymer block components (except for vinyl aromatic hydrocarbon polymer block components having an average polymerization degree of about 30 or less) obtained by the method.

Block rate (% by weight)=(the weight of vinyl aromatic hydrocarbon polymer blocks in a block copolymer/the weight of the whole vinyl aromatic hydrocarbons in the block copolymer)×100

3) Block Styrene Peak Molecular Weight

The block styrene peak molecular weight was measured with a GPC apparatus (manufactured by Waters Corporation, U.S.A.) at a sample concentration of about 0.05 part by weight at 42° C., using as a sample the vinyl aromatic hydrocarbon polymer block component obtained in 2), and tetrahydrofuran as a solvent. Phenogel $10^4$, $10^5$ and $10^6$ manufactured by Phenomenex Inc. were used as columns. Monodisperse polystyrene for GPC was subjected to GPC measurement, and the peak molecular weight was read from a chromatochart measured, based on calibration curves of the peak count number thereof and the number average molecular weight of the monodisperse polystyrene.

4) The Amount of Block Styrene of 35000 or Less

The total area of a molecular weight distribution curve was determined from the chromatochart obtained in 3), and a value obtained by dividing an area of a molecular weight of 35000 or less by the total area of the molecular weight distribution curve was represented in percentage.

5) Short-Chain Styrene Content

The content of short-chain styrene polymer moieties contained in a block copolymer was obtained by passing oxygen having an ozone (O3) concentration of 1.5% through a dichloromethane solution of the block copolymer at 150 ml/min to conduct oxidative degradation, adding dropwise the resulting ozonide into diethyl ether mixed with aluminum lithium hydride to reduce it, then, adding dropwise pure water to conduct hydrolysis, conducting GPC measurement of vinyl aromatic hydrocarbon components obtained by adding potassium carbonate to perform salt precipitation and filtration, and calculating the area ratio of peaks obtained (see Takayuki Tanaka, Toshiya Sato and Yasunobu Nakafutami, *Kobunshi Gakkai Yokoshu* (Preprints of Meeting of the Society of Polymer Science), 29, 2051 (1980)).

6) Number Average Molecular Weight

The number average molecular weight of a block copolymer or a hydrogenated block copolymer was measured in the same manner as with 3) described above. As for the number average molecular weight, monodisperse polystyrene for GPC was subjected to GPC, and the number average molecular weight was determined according to a conventional method, based on calibration curves of the peak count number thereof and the number average molecular weight of the monodisperse polystyrene.

7) Amount of Vinyl Bonds and Hydrogenation Ratio

Measurement was made with a nuclear magnetic resonance apparatus (apparatus name: DPX-400; manufactured by Bruker, Germany), using a block copolymer or a hydrogenated block copolymer.

8) Crystallization Peak and Heat Quantity of Crystallization Peak

The crystallization peak and heat quantity of crystallization peak of a hydrogenated product of a block copolymer were measured with a DSC (apparatus name: DSC 3200S; manufactured by MacScience Co., Ltd.). The temperature was elevated from room temperature to 150° C. at a temperature elevation rate of 30° C./min, and then, decreased to −100° C. at a temperature decreasing rate of 10° C./min to measure a crystallization curve, thereby confirming the presence or absence of the crystallization peak. Further, when the crystallization peak existed, the temperature at which the peak appeared was taken as the crystallization peak temperature, and the heat quantity of crystallization peak was measured.

9) Measurement of Dynamic Viscoelasticity

The dynamic viscoelasticity measurement of a block copolymer or a hydrogenated block copolymer was measured with a viscoelasticity measuring apparatus, DVE-V4, manufactured by Rheology Co., Ltd., at an oscillation frequency of 35 Hz at a temperature elevation rate of 3° C./min at a measurement temperature ranging from −100° C. to 150° C., using as a sample a 2-mm thick test piece obtained by hot press compression molding. The hot press compression molding was conducted at a temperature of 200° C. under a pressure of 150 Kg/cm² for a compression time of 5 minutes.

10) Shrinkage Ratio

A stretched film was immersed in silicone oil of 65° C. for 5 minutes, and the shrinkage ratio at 65° C. was calculated according to the following equation:

Heat shrinkage ratio (%)=$(L-L1)/L$×100

L: length before shrinkage,
L1: length after shrinkage

Further, a heat shrinkable multilayer film was immersed in hot water of 80° C. for 10 seconds, and the shrinkage ratio thereof at 80° C. was calculated according to the above-shown equation.

11) Natural Shrinkage Ratio

A stretched film having a shrinkage ratio measured at 80° C. of 40% was allowed to stand at 35° C. for 5 days, and the natural shrinkage ratio is a value calculated according to the following equation:

Natural shrinkage ratio (%)=$(L2-L3)/L2$×100

L2: length before shrinkage,
L3: length after shrinkage

Lower natural shrinkage ratio results in more excellent natural shrinkability.

Further, a heat shrinkable multilayer film having a shrinkage ratio at 80° C. of 30% was allowed to stand at 35° C. for 5 days, and the natural shrinkage ratio at 80° C. was calculated according to the following equation.

12) Tensile Elastic Modulus and Breaking Elongation

Measurement was made at a pulling rate of 5 mm/min in the stretching direction of a film, based on JIS K-6732. The width of a test piece was 12.7 mm, and the distance between gauge marks was 50 mm. Measurement was made at a measuring temperature of 23° C. The unit is Kg/cm².

13) Puncture Impact Strength

Measurement was made based on JIS P-8134. The unit is Kg·cm.

14) Haze

A surface of a sheet before stretching was coated with liquid paraffin, and measurement was made based on ASTM D1003.

15) Blocking Property

Two 5-cm×5-cm heat shrinkable multilayer films were superposed upon each other, and allowed to stand at 40° C. for 7 days with a load of 100 g/cm² applied. Then, a blocking state of the films was visually judged.

<Criteria of Judgment>
A: No blocking is observed.
B: Blocking is observed.

16) Fusion Bonding in Hot Water

Stretched films were each wrapped around glass bottles having a diameter of about 8 cm, respectively, and allowed to stand in hot water at 70° C. for 5 minutes in the stacking form of three straw bags. The criteria of judgment are as follows:

S: The films are not fusion bonded at all.
A: The films are slightly fusion bonded, but easily separable.
B: The films are fusion bonded, and not easily separable.

17) FE

Block copolymer (I) was continuously sheet formed to a sheet having a thickness of 0.3 mm, using a 40-mm sheet extruder under conditions of an extrusion temperature of 240° C. for 6 hours. The number of FE's having a size of 0.5 mm or more per a sheet area of 300 m² after 5 minutes from the start of operation and that after 6 hours therefrom were each counted, and evaluation was made by the difference in the number of FE's therebetween.

Examples 1 to 11 and Comparative Examples 1 and 2

In the measurement of the heat shrinkable film performances, a composition in which the kind and amount of block copolymers: A-1 to A-11, other block copolymers: B-4 (styrene-butadiene-based block copolymer, Tufprene 126 manufactured by Asahi Chemical Industry Co., Ltd.) and B-5 (styrene-butadiene-based hydrogenated block copolymer, Tuftec 1041 manufactured by Asahi Chemical Industry Co., Ltd.), styrene-n-butyl acrylate copolymers: B-1 and B-2, and general-purpose polystyrene: B-3 (A&M Polystyrene 685 manufactured by A&M Styrene Co. Ltd.) are shown in Table 4 was molded to a sheet form having a thickness of 0.25 mm at 200° C., using a 40-mm extruder, and then, the sheet was uniaxially stretched at a stretching ratio of 5 at a stretching temperature of 100° C. (in Comparative Example 5, stretching at 100° C. was impossible, so that the sheet was stretched at 110° C.) in the transverse direction, using a tenter, thereby obtaining a heat shrinkable film having a thickness of about 60 µm. The film performances of this heat shrinkable film are shown in Table 4. It is seen that the performances of the heat shrinkable films of the invention are excellent in rigidity represented by tensile elastic modulus, low-temperature shrinkability represented by the heat shrinkage ratio at 65° C., natural shrinkability, impact resistance represented by puncture impact strength, fusion bonding in hot water, and transparency represented by haze. The measurements of the sheet and film performances were conducted by the above-mentioned methods.

Examples 12 to 19 and Comparative Examples 3 to 6

Compounded compositions shown in Table 9 were extruded through a T-die to form a three-layer sheet using the compositions as an intermediate layer and surface and back layers, and the sheet was longitudinally stretched 1.2 times to form a sheet having a thickness of 0.25 mm. Then, the sheet was laterally stretched 5 times with a tenter to obtain a heat shrinkable film having a thickness of about 50 µm. The thickness ratio (%) of the intermediate layer and the surface and back layers was 15 (surface layer)/70 (intermediate layer)/15 (back layer). The performances of the resulting three-layer heat shrinkable films are shown in Table 9. Adekastab LA-32 (manufactured by Asahi Denka Co., Ltd.) was added as an ultraviolet absorber in an amount of 0.2 part by weight per 100 parts by weight of the surface and back layers. Styrene polymers, aliphatic unsaturated carboxylic acid ester-styrene copolymers and rubber-modified styrene polymers are shown in Table 7, and lubricants are shown in Table 8. The measurements of the sheet and film performances were conducted by the above-mentioned methods.

TABLE 1

|  | Styrene Content (% by weight) | Butadiene/Isoprene (weight ratio) | Number Average Molecular Weight | Block Rate (% by weight) | Peak Molecular Weight of Block Styrene | Amount of Block Styrene of 35000 or Less (% by weight) |
|---|---|---|---|---|---|---|
| A-1 | 80 | 100/0 | 148000 | 52 | (1) 12000<br>(2) 70000 | 63 |
| A-2 | 74 | 50/50 | 132000 | 55 | (1) 9000<br>(2) 42000 | 67 |
| A-3 | 72 | 30/70 | 128000 | 57 | (1) 9000<br>(2) 50000 | 71 |
| A-4 | 58 | 100/0 | 120000 | 8 | (1) 8500<br>(2) 28000 | 76 |
| A-5 | 93 | 50/50 | 187000 | 86 | (1) 13000<br>(2) 170000 | 12 |

TABLE 2

|  | Styrene Content (% by weight) | Component (% by weight) | Number Average Molecular Weight | Styrene Content (% by weight) | Butadiene/Isoprene (weight ratio) | Peak Molecular Weight of Block Styrene | Block Rate (% by weight) | Amount of 35000 or Less of Block Styrene (% by weight) |
|---|---|---|---|---|---|---|---|---|
| A-6 | 79 | (Component 1) 60 | 163000 | 87 | 40/60 | (1) 23000<br>(2) 108000 | 64 | 49 |
|  |  | (Component 2) 40 | 74000 | 68 | 40/60 | (1) 12000<br>(2) 43000 |  |  |

TABLE 2-continued

| | Styrene Content (% by weight) | Component (% by weight) | Number Average Molecular Weight | Styrene Content (% by weight) | Butadiene/ Isoprene (weight ratio) | Peak Molecular Weight of Block Styrene | Block Rate (% by weight) | Amount of 35000 or Less of Block Styrene (% by weight) |
|---|---|---|---|---|---|---|---|---|
| A-7 | 77 | (Component 1) 50 | 163000 | 87 | 40/60 | (1) 24000 (2) 112000 | 55 | 63 |
| | | (Component 3) 50 | 80000 | 67 | 50/50 | (1) 22000 | | |
| A-8 | 78 | (Component 4) 45 | 172000 | 90 | 30/70 | (1) 26000 | 54 | 62 |
| | | (Component 2) 55 | 74000 | 68 | 40/60 | (1) 12000 (2) 43000 | | |
| A-9 | 70 | — | 105000 | — | 50/50 | (1) 18000 (2) 38000 | 50 | 74 |
| A-10 | 75 | — | 51000 | — | 100/0 | (1) 12000 (2) 38000 | 73 | 69 |
| A-11 | 79 | (Component 1) 60 | 148000 | 87 | 40/60 | (1) 19000 (2) 96000 | 67 | 63 |
| | | (Component 2) 40 | 68000 | 68 | 40/60 | (1) 9500 (2) 39000 | | |

TABLE 3

| | Styrene Content (% by weight) |
|---|---|
| B-1 | 79 |
| B-2 | 88 |
| B-3 | 100 |

B-1, 2: Styrene-n-butyl acrylate copolymer
B-3: A&M Polystyrene 685 (manufactured by A&M Styrene Co. Ltd.)

TABLE 4

| | | Ex. 1 | Ex. 2 | Ex. 3 | Ex. 4 | Ex. 5 | Ex. 6 | Ex. 7 |
|---|---|---|---|---|---|---|---|---|
| Compounding Composition | Kind and Amount of Block Copolymer (A) (% by weight) | A-1 100 | A-2 100 | A-3 90 | A-3 80 | A-2 90 | A-6 94 | A-7 96 |
| | Kind and Amount of Styrene Resin (B) etc. (% by weight) | — — | — — | B-1 10 | B-2 20 | B-3 10 | B-4 6 | B-5 4 |
| Sheet · Film Performances | Tensile Elastic Modulus (Kg/cm$^2$) | 16800 | 15800 | 16800 | 17300 | 17100 | 16300 | 15800 |
| | Puncture Impact Strength (Kg · cm) | 11 | 16 | 10 | 9 | 9 | 12 | 12 |
| | Haze (%) | 0.3 | 0.4 | 0.6 | 0.7 | 0.8 | 0.5 | 0.9 |
| | Shrinkage Ratio at 65° C. (%) | 24 | 29 | 26 | 22 | 19 | 23 | 21 |
| | Natural Shrinkage Ratio (%) | 0.13 | 0.09 | 0.11 | 0.15 | 0.23 | 0.12 | 0.15 |
| | Fusion Bonding in Hot Water | A | A | A | S | S | A | A |

| | | Ex. 8 | Ex. 9 | Ex. 10 | Ex. 11 | Com. Ex. 1 | Com. Ex. 2 |
|---|---|---|---|---|---|---|---|
| Compounding Composition | Kind and Amount of Block Copolymer (A) (% by weight) | A-8 100 | A-9 65 | A-10 100 | A-11 100 | A-4 100 | A-5 100 |
| | Kind and Amount of Styrene Resin (B) etc. (% by weight) | — — | B-1 35 | — — | — — | — — | — — |
| Sheet · Film Performances | Tensile Elastic Modulus (Kg/cm$^2$) | 16300 | 16200 | 17600 | 16900 | 8100 | 20800 |
| | Puncture Impact Strength (Kg · cm) | 9 | 12 | 13 | 10 | 20 or more | 2 or more |
| | Haze (%) | 0.3 | 0.3 | 0.8 | 0.6 | 0.3 | 0.3 |
| | Shrinkage Ratio at 65° C. (%) | 28 | 33 | 18 | 21 | 40 | 4 |
| | Natural Shrinkage Ratio (%) | 0.11 | 0.08 | 0.17 | 0.14 | 1.6 | 6.2 |
| | Fusion Bonding in Hot Water | A | A | S | S | B | S |

B-4: Tufprene 126 (manufactured by Asahi Chemical Industry Co., Ltd.)
B-5: Tuftec 1041 (manufactured by Asahi Chemical Industry Co., Ltd.)

TABLE 5

| Block Copolymer | | Polymer Structure (*1) | Composition Ratio |
|---|---|---|---|
| C-1 | Component (A-a) | S—B/I/S—S | 35-10/10/7-38 |
| | Component (A-b) | S—B/I/S—S | 35-10/10/7-38 |
| C-2 | Component (A-a) | S—B/I/S—S | 30-15/8/6-41 |
| | Component (A-b) | S—B/I/S—S | 30-15/8/6-41 |
| C-3 | Component (A-a) | B/S—S—B/I/S—S | 8/5-25-1/6/8-47 |
| | Component (A-b) | S—B/I/S—S | 8/5-25-1/6/8-47 |
| C-4 | Component (A-a) | S—B/I/S—S | 58-13/8/3-18 |
| | Component (A-b) | S—B/I/S—S | 31-21/14/5-29 |
| C-5 | Component (A-a) | (S—B/I/S)4-X | 70-11/9/10 |
| | Component (A-b) | (S—B/I/S)4-X | 70-11/9/10 |
| C-6 | Component (A-a) | S—B—S | 25-45-30 |
| | Component (A-b) | S—B—S | 25-45-30 |
| C-7 | Component (A-a) | S—B/I/S—S | 45-1/1/3-50 |
| | Component (A-b) | S—B/I/S—S | 45-1/1/3-50 |
| C-8 | Component (A-a) | S—B/I/S—S | 30-12/6/30-22 |
| | Component (A-b) | S—B/I/S—S | 30-12/6/30-22 |
| C-9 | Component (A) | S—B/I—S | 41-12/6-41 |
| D-1 | Component (A) | S—B/I/S—S | 25-20/5/14-36 |

*1 B/I represents a copolymer moiety of butadiene and isoprene, B/I/S represents a copolymer moiety of butadiene, isoprene and styrene, S represents a styrene moiety, and X represents a residue of silicon tetrachloride. 2-[1-(2-Hydroxy-3,5-di-t-pentylphenyl)ethyl]-4,6-di-t-pentylphenyl acrylate was added as a stabilizer to all block copolymers in an amount of 0.3 part by weight per 100 parts by weight of the block copolymer.

TABLE 6

| | | C-1 | C-2 | C-3 | C-4 | C-5 | C-6 | C-7 | C-8 | C-9 |
|---|---|---|---|---|---|---|---|---|---|---|
| Styrene Content (% by weight) | | 83 | 77 | 85 | 72 | 80 | 55 | 98 | 82 | 82 |
| Butadiene Content (% by weight) | | 10 | 15 | 9 | 17 | 11 | 45 | 1 | 12 | 12 |
| Isoprene Content (% by weight) | | 7 | 8 | 6 | 11 | 9 | 0 | 1 | 6 | 6 |
| Block Styrene Content (parts by weight) | | 73 | 71 | 72 | 68 | 70 | 55 | 95 | 52 | 82 |
| Short-Chain Styrene Content (% by weight) | | 10 | 4 | 12 | 3 | 9 | 0 | 2 | 31 | 0 |
| Tanδ Peak Temperature (° C.) | | 118 | 119 | 110 | 109 | 120 | 123 | 127 | 86 | 129 |
| Peak Molecular Weight of Block Copolymer | Component (A-a) | 160000 | 140000 | 190000 | 170000 | 140000 | 93000 | 142000 | 160000 | — |
| | Component (A-b) | 70000 | 90000 | 65000 | 46000 | 70000 | 30000 | 68000 | 52000 | 130000 |
| Component (A-a)/Component (A-b) Weight Ratio | | 50/50 | 40/60 | 40/60 | 45/55 | 60/40 | 80/20 | 60/40 | 45/55 | — |

TABLE 7

| | D-1 | D-2 | D-3 | D-4 | D-5 |
|---|---|---|---|---|---|
| Styrene Content (% by weight) | 75 | 82 | 90 | HIPS | GPPS |
| Butadiene Content (% by weight) | 20 | — | — | | |
| Isoprene Content (% by weight) | 5 | — | — | | |
| Block Styrene Content (parts by weight) | 61 | — | — | | |
| Short Chain Styrene Content (% by weight) | 7 | — | — | | |
| Methyl Methacrylate Content (% by weight) | — | — | 10 | | |
| n-Butyl Acrylate Content (% by weight) | — | 18 | — | | |
| Structure of Block Copolymer*1 | S-B/I/S-S | — | — | | |

HIPS: A&M Polystyrene 475D (manufactured by A&M Styrene Co. Ltd.)
GPPS: A&M Polystyrene 685 (manufactured by A&M Styrene Co. Ltd.)
The number average molecular weight of block copolymer D-1 is 93000, and the short-chain styrene content is 16% by weight.

TABLE 8

| E-1 | Stearoamide |
|---|---|
| E-2 | Microcrystalline Wax |
| E-3 | Stearic Acid |

TABLE 9

|  |  | Ex. 12 | Ex. 13 | Ex. 14 | Ex. 15 | Ex. 16 | Ex. 17 | Ex. 18 | Ex. 19 | Com. Ex. 3 | Com. Ex. 4 | Com. Ex. 5 |
|---|---|---|---|---|---|---|---|---|---|---|---|---|
| Surface Layer · Back Layer | Block Copolymer (% by weight) | C-1 98 | C-2 90 | C-3 98 | C-4 80 | C-5 100 | C-1 95 | C-3 92 | A-10 98 | C-6 80 | C-7 98 | C-8 90 |
|  | Styrene Resin etc. (% by weight) | — | D-3 8 | — | D-1 18 | — | D-7 5 | D-6 6 | — | D-2 18 | — | D-5 8 |
|  | (% by weight) | D-4 2 | D-4 2 | D-4 2 | D-4 2 | D-4 2 | D-4 2 | D-4 2 | D-4 2 | D-4 2 | D-4 2 | D-4 2 |
|  | Lubricant (% by weight) | E-1 0.2 | E-1 0.2 | E-1 0.2 | E-1 0.2 | E-1 0.2 | E-2 0.5 | E-3 0.5 | E-1 0.2 | — | E-1 0.2 | E-1 0.2 |
| Inner Layer | Block Copolymer (% by weight) | D-1 60 | D-1 60 | D-1 60 | D-1 60 | D-1 60 | D-1 60 | C-4 50 | D-1 60 | D-1 60 | D-1 60 | D-1 60 |
|  | Styrene Resin etc. (% by weight) | D-2 40 | D-2 40 | D-2 40 | D-2 40 | D-2 40 | D-2 40 | D-2 50 | D-2 40 | D-2 40 | D-2 40 | D-2 40 |
| Physical properties | Tensile Elastic Modulus kgf/cm$^2$ | 16900 | 17900 | 17700 | 17100 | 17400 | 16600 | 16400 | 16300 | 15400 | 19600 | 18300 |
|  | Elongation at Break % | 140 | 100 | 110 | 120 | 130 | 170 | 190 | 170 | 220 | 40 | 70 |
|  | Puncture Impact Value kgf-cm | 5.2 | 4.6 | 4.8 | 4.9 | 5.0 | 5.6 | 5.7 | 5.6 | 6.4 | 2.4 | 3.2 |
|  | Haze Value % | 3.2 | 3.4 | 3.2 | 3.2 | 3.0 | 3.9 | 3.6 | 3.4 | 7.6 | 3.1 | 3.2 |
|  | Shrinkage Ratio at 80° C. % | 28 | 23 | 26 | 26 | 27 | 27 | 27 | 30 | 29 | 14 | 17 |
|  | Natural Shrinkage Ratio % | 1.6 | 1.8 | 1.6 | 1.7 | 1.6 | 1.7 | 1.8 | 1.6 | 1.5 | 3.3 | 2.9 |
|  | Fusion Bonding in Hot Water | A | A | A | A | A | A | A | A | B | A | B |
|  | Blocking Property | A | A | A | A | A | A | A | A | B | A | A |
|  | FE | A | A | A | A | A | A | A | A | B | A | A |

D-6: Tufprene 126 (manufactured by Asahi Chemical Industry Co., Ltd.)
D-7: Tuftec 1041 (manufactured by Asahi Chemical Industry Co., Ltd.)

Although the invention has been described in detail and with reference to specific embodiments thereof, it will be apparent to one skilled in the art that various changes and modification may be made therein without departing from the spirit and scope of the invention.

This application is based on Japanese patent application Nos. 2002-123510 (filed on Apr. 25, 2002), 2002-341185 (filed on Nov. 25, 2002) and 2003-026606 (filed on Feb. 4, 2003), the contents thereof being incorporated herein by reference.

INDUSTRIAL APPLICABILITY

The heat shrinkable film using the block copolymer or hydrogenated block copolymer of the invention is transparent and excellent in rigidity, natural shrinkability, low-temperature shrinkability, fusion bonding in hot water and impact resistance. Accordingly, it can achieve thinning of the film, and dimensional stability and low-temperature shrinkability at the same time, and can be suitably utilized for drink container packaging, cap seals, various labels and the like.

Further, the heat shrinkable multilayer film using the block copolymer or hydrogenated block copolymer of the invention has a few FE's, and is satisfactory in natural shrinkability, rigidity, blocking resistance, resistance to fusion bonding in hot water, impact resistance, and further, low-temperature shrinkability. Making the best use of the feature that the film has a few FE's like this, it can be suitably utilized for various packaging film applications such as labels and cap seals on which various prints are applied.

The invention claimed is:

1. A block copolymer comprising styrene and a conjugated diene having a weight ratio of 60/40 to 90/10, wherein the number average molecular weight of said block copolymer, measured by gel permeation chromatography (GPC), is 30,000 to 500,000,
   wherein styrenes having an average polymerization degree of 30 or more have a block rate of from 10 to 90% by weight, said block rate being equal to the weight of styrenes having an average polymerization degree of 30 or more/the weight of the total amount of styrenes in the block copolymer×100,
   wherein the styrenes having an average polymerization degree of 30 or more have a peak molecular weight within the molecular weight range of 5,000 to 30,000 as measured by gel permeation chromatography (GPC), and
   wherein 45 to 80% by weight of the styrenes having an average polymerization degree of 30 or more have a molecular weight of 35,000 or less as measured by gel permeation chromatography (GPC).

2. The block copolymer according to claim 1, wherein the styrenes having an average polymerization degree of 30 or more have peak molecular weights as measured by gel permeation chromatography (GPC) within the molecular weight range of 5,000 to 30,000 and within the molecular weight range of 35,000 to 150,000.

3. A block copolymer composition which comprises:
   10 to 90 parts by weight of a block copolymer according to claim 1 or 2 (component 1) having a weight ratio of a styrene and a conjugated diene of from 70/30 to 90/10, wherein the styrenes having an average polymerization degree of 30 or more have peak molecular weights within the molecular weight range of 5,000 to 30,000 as measured by gel permeation chromatography (GPC), and within the molecular weight range of 35,000 to 150,000 as measured by gel permeation chromatography (GPC), and
   90 to 10 parts by weight of a block copolymer according to claim 1 or 2 (component 2) having a weight ratio of a styrene and a conjugated diene of from 60/40 to 85/15, wherein the styrenes having an average polymerization degree of 30 or more have peak molecular weights within the molecular weight range of 5,000 to 30,000 as measured by gel permeation chromatography (GPC), and within the molecular weight range of 35,000 to 150,000 as measured by gel permeation chromatography (GPC), wherein the total amount of component 1 and component 2 is 100 parts by weight, and component 1 has a styrene content larger than that of component 2 by at least 3% by weight.

4. A block copolymer composition which comprises:

10 to 90 parts by weight of a block copolymer according to claim 1 or 2 (component 1) having a weight ratio of a styrene and a conjugated diene of from 70/30 to 90/10, wherein the styrenes having an average polymerization degree of 30 or more have peak molecular weights within the molecular weight range of 5,000 to 30,000 as measured by gel permeation chromatography (GPC), and within the molecular weight range of 35,000 to 150,000 as measured by gel permeation chromatography (GPC); and 90 to 10 parts by weight of a block copolymer according to claim 1 or 2 (component 3) having a weight ratio of a styrene and a conjugated diene of from 60/40 to 85/15, wherein the styrenes having an average polymerization degree of 30 or more have a peak molecular weight within the molecular weight range of 5,000 to 30,000 as measured by gel permeation chromatography (GPC), wherein the total amount of component 1 and component 3 is 100 parts by weight, and component 1 has a styrene content larger than that of component 3 by at least 3% by weight.

5. A block copolymer composition which comprises:

10 to 90 parts by weight of a block copolymer according to claim 1 or 2 (component 4) having a weight ratio of a styrene and a conjugated diene of from 70/30 to 90/10, wherein the styrenes having an average polymerization degree of 30 or more have a peak molecular weight within the molecular weight range of 5,000 to 30,000 as measured by gel permeation chromatography (GPC), and 90 to 10 parts by weight of a block copolymer according to claim 1 or 2 (component 2) having a weight ratio of a styrene and a conjugated diene of from 60/40 to 85/15, wherein the styrenes having an average polymerization degree of 30 or more have peak molecular weights within the molecular weight range of 5,000 to 30,000 as measured by gel permeation chromatography (GPC), and within the molecular weight range of 35,000 to 150,000 as measured by gel permeation chromatography (GPC), wherein the total amount of component 4 and component 2 is 100 parts by weight, and component 4 has a styrene content larger than that of component 2 by at least 3% by weight.

6. The block copolymer according to claim 1 or 2, having a content of short-chain styrene polymer moieties with 1 to 3 styrene monomer units of from 1 to 25% by weight based on the total amount of the styrenes constituting the block copolymer.

7. The block copolymer according to claim 1 or 2, wherein the conjugated diene constituting the block copolymer is butadiene and isoprene, and the weight ratio of butadiene and isoprene in the block copolymer is within the range of 3/97 to 90/10.

8. The block copolymer according to claim 1 or 2, wherein at least one polymer block selected from the group consisting of (i) a copolymer block comprising isoprene and 1,3-butadiene, (ii) a copolymer block comprising isoprene and a styrene and (iii) a copolymer block comprising isoprene, 1,3-butadiene and a styrene is incorporated into the block copolymer.

9. A hydrogenated block copolymer obtained by hydrogenating the block copolymer according to claim 1 or claim 2.

10. The hydrogenated block copolymer according to claim 9, which has a crystallization peak in a temperature region of 20° C. or higher, in a differential scanning calorimetry (DSC) chart.

11. A block copolymer composition comprising:
component (A) which is a block copolymer according to claim 1 or 2 or a hydrogenated product thereof; and
component (B) which is a styrene polymer;
wherein the weight ratio of component (A) and component (B) is from 99.9/0.1 to 20/80.

12. The block copolymer composition according to claim 11, wherein the styrene polymer of component (B) is at least one member selected from the group consisting of the following a) to c):
a) styrene polymers,
b) aliphatic unsaturated carboxylic acid ester-styrene copolymers, and
c) rubber-modified styrene polymers.

13. The block copolymer composition according to claim 11, which contains at least one lubricant selected from the group consisting of fatty acid amides, paraffins, hydrocarbon resins, and fatty acids in an amount of from 0.01 to 5 parts by weight per 100 parts by weight of the block copolymer or a hydrogenated product thereof.

14. The block copolymer composition according to claim 11, which contains at least one stabilizer selected from the group consisting of 2-[1-(2-hydroxy-3,5-di-t-pentylphenyl) ethyl]-4,6-di-t-pentylphenyl acrylate, 2-t-butyl-6-(3-t-butyl-2-hydroxy-5-methylbenzyl)-4-methylphenyl acrylate and 2,4-bis[(octylthio)methyl]-o-cresol in an amount of from 0.05 to 3 parts by weight per 100 parts by weight of the block copolymer or a hydrogenated product thereof.

15. The block copolymer composition according to claim 11, which contains at least one ultraviolet absorber or light stabilizer selected from the group consisting of benzophenone-based ultraviolet absorbers, benzotriazole-based ultraviolet absorbers and hindered amine-based light stabilizers in an amount of from 0.05 to 3 parts by weight per 100 parts by weight of the block copolymer or a hydrogenated product thereof.

16. A sheet/film comprising the block copolymer or a hydrogenated product thereof according to claim 1.

17. A heat shrinkable film obtained by stretching a film comprising the block copolymer or a hydrogenated product thereof according to claim 1, wherein the film has a heat shrinkage ratio at 65° C. in the stretching direction of from 5 to 60%, and a tensile elastic modulus in the stretching direction of 7,000 to 30,000 Kg/cm$^2$.

18. A heat shrinkable multilayer film comprising as at least one layer of the multilayer film, a layer obtained by stretching a film comprising the block copolymer or a hydrogenated product thereof according to claim 1, wherein the heat shrinkage ratio at 80° C. in the stretching direction is from 10 to 80%.

19. A heat shrinkable multilayer film comprising as at least one layer of the multilayer film, a layer comprising the block copolymer or a hydrogenated product thereof according to claim 1, which has at least two peak molecular weights within the range of 40,000 to 300,000, in the gel permeation chromatography (GPC) measurement, and moreover, has at least one tan δ peak temperature within the temperature range of 90 to 125° C., in the dynamic viscoelasticity measurement.

20. The heat shrinkable multilayer film according to claim 18 or 19, having a heat shrinkage ratio at 65° C. in a stretching direction from 5 to 60%, and a tensile elastic modulus in a stretching direction of 7,000 to 30,000 Kg/cm².

21. A sheet/film comprising the block copolymer composition according to claim 11.

22. A heat shrinkable film obtained by stretching a film comprising the block copolymer composition according to claim 11, wherein the film has a heat shrinkage ratio at 65° C. in the stretching direction of from 5 to 60%, and a tensile elastic modulus in the stretching direction of 7,000 to 30,000 Kg/cm².

23. A heat shrinkable multilayer film comprising as at least one layer of the multilayer film, a layer obtained by stretching a film comprising the block copolymer composition according to claim 11, wherein the heat shrinkage ratio at 80° C. in the stretching direction is from 10 to 80%.

24. A heat shrinkable multilayer film comprising as at least one layer of the multilayer film, a layer comprising the block copolymer composition according to claim 11, which has at least two number average peak molecular weights within the range of 40,000 to 300,000, in the gel permeation chromatography (GPC) measurement, and moreover, has at least one tan δ peak temperature within the temperature range of 90 to 125° C., in the dynamic viscoelasticity measurement.

25. The heat shrinkable multilayer film according to claim 23 or 24, having a heat shrinkage ratio at 65° C. in a stretching direction of from 5 to 60%, and a tensile elastic modulus in a stretching direction of 7,000 to 30,000 Kg/cm².

* * * * *